United States Patent
Takeuchi et al.

(10) Patent No.: US 9,164,328 B2
(45) Date of Patent: Oct. 20, 2015

(54) LIQUID CRYSTAL DISPLAY APPARATUS AND ELECTRONIC DEVICE

(71) Applicant: Japan Display Inc., Tokyo (JP)

(72) Inventors: Shumpei Takeuchi, Tokyo (JP); Akio Ota, Tokyo (JP)

(73) Assignee: Japan Display Inc., Tokyo (JP)

( * ) Notice: Subject to any disclaimer, the term of this patent is extended or adjusted under 35 U.S.C. 154(b) by 178 days.

(21) Appl. No.: 13/944,505

(22) Filed: Jul. 17, 2013

(65) Prior Publication Data

US 2014/0028938 A1  Jan. 30, 2014

(30) Foreign Application Priority Data

Jul. 27, 2012  (JP) ................................ 2012-166578

(51) Int. Cl.
G02F 1/1333 (2006.01)
G02F 1/1339 (2006.01)
G02F 1/1335 (2006.01)
G02F 1/1343 (2006.01)

(52) U.S. Cl.
CPC ...... *G02F 1/13394* (2013.01); *G02F 1/133512* (2013.01); *G02F 2001/134372* (2013.01)

(58) Field of Classification Search
CPC ............ G02F 1/133345; G02F 1/1368; G02F 1/136286; G02F 1/134363; G02F 1/133512; G02F 1/13394
USPC ............... 349/12, 19, 56, 167, 182, 187, 193, 349/155–157, 110
See application file for complete search history.

(56) References Cited

U.S. PATENT DOCUMENTS

| | | | |
|---|---|---|---|
| 7,345,731 B2 | 3/2008 | Sumi et al. | |
| 7,428,034 B2 | 9/2008 | Sumi et al. | |
| 7,535,533 B2 | 5/2009 | Lee et al. | |
| 7,911,577 B2 | 3/2011 | Lee et al. | |
| 8,400,603 B2 | 3/2013 | Yoso et al. | |
| 8,736,781 B2 | 5/2014 | Lee | |
| 2005/0259210 A1* | 11/2005 | Lee et al. | 349/156 |

(Continued)

FOREIGN PATENT DOCUMENTS

| CN | 1696769 | 11/2005 |
|---|---|---|
| CN | 102591079 | 7/2012 |
| JP | 2010072613 | 4/2010 |

(Continued)

OTHER PUBLICATIONS

Notification of Reasons for Refusal issued in connection with Korean Patent Application No. 10-2013-88529, dated Jun. 27, 2014. (10 pages).

(Continued)

*Primary Examiner* — Thanh-Nhan P Nguyen
(74) *Attorney, Agent, or Firm* — K&L Gates LLP

(57) ABSTRACT

A spacer portion for keeping a thickness of a liquid crystal layer is provided at an intersecting portion between a gate wiring and a source wiring when seen in a plan view, and a light shielding portion for spacer portion which shields the spacer portion from light is provided. The spacer portion is disposed in a region in which the light shielding portion for spacer portion is provided when seen in a plan view. Then, the source wiring has two bend portions which are bent in mutually different directions in the region in which the light shielding portion for spacer portion is provided when seen in a plan view.

7 Claims, 16 Drawing Sheets

(56) References Cited

U.S. PATENT DOCUMENTS

2010/0079712 A1    4/2010   Tanaka et al.
2012/0133853 A1    5/2012   Ito et al.

FOREIGN PATENT DOCUMENTS

| | | |
|---|---|---|
| JP | 2011-027951 | 2/2011 |
| JP | 2011-164369 | 8/2011 |
| KR | 10-2005-0107900 | 11/2005 |
| TW | 1243271 | 11/2005 |
| TW | 201106075 | 2/2011 |

OTHER PUBLICATIONS

Taiwan Office Action issued May 18, 2015 in corresponding Taiwan Application No. 102122782.

\* cited by examiner

LIQUID CRYSTAL DISPLAY APPARATUS AND ELECTRONIC DEVICE

CROSS REFERENCES TO RELATED APPLICATIONS

The present application claims priority to Japanese Priority Patent Application JP 2012-166578 filed in the Japan Patent Office on Jul. 27, 2012, the entire content of which is hereby incorporated by reference.

BACKGROUND

The present invention relates to a liquid crystal display apparatus, and particularly relates to a liquid crystal display apparatus provided with a plurality of pixels.

Since a liquid crystal display apparatus has such features as light weight, compact size and low power consumption in comparison with a CRT (Cathode Ray Tube), it is used in various types of electronic device as a display. A liquid crystal display apparatus displays an image by changing an orientation of liquid crystal molecules aligned in a predetermined direction by an electric field and controlling the amount of light transmission through a liquid crystal layer.

A liquid crystal display apparatus has a pair of substrates including, for example, an array substrate and a color filter substrate. In the array substrate, for example, thin film transistors (TFTs) as switching elements are formed in an array so as to correspond to each of the pixels of the liquid crystal display apparatus. In the color filter substrate, color filters are formed so as to correspond to each of the pixels of the liquid crystal display apparatus. A space between the array substrate and the color filter substrate is filled with a liquid crystal layer, and an electric field applied to the liquid crystal layer is changed by switching the TFT in each pixel.

As a method of applying an electric field to a liquid crystal layer, the method utilizing a vertical electric field scheme and the method utilizing a lateral electric field scheme have been known.

In the liquid crystal display apparatus employing the lateral electric field scheme, for example, on a liquid crystal layer side of either one of a pair of substrates including an array substrate and a color filter substrate, a pair of electrodes is provided so as to be insulated from each other, and an approximately lateral electric field is applied to the liquid crystal molecules. As the liquid crystal display apparatus employing the lateral electric field scheme, the apparatus of an IPS (In-Plane Switching) mode in which the pair of electrodes is not overlapped with each other when seen in a plan view and the apparatus of an FFS (Fringe Field Switching) mode in which the electrodes are overlapped with each other have been known.

Of these, in the liquid crystal display apparatus of the FFS mode, paired electrodes including a common electrode and a pixel electrode are each disposed on respectively different layers via an insulating film, a slit-like aperture is provided in the common electrode or the pixel electrode on the liquid crystal layer side, and an approximately lateral electric field passing through this slit-like aperture is applied to the liquid crystal layer. Since the liquid crystal display apparatus of the FFS mode has such effects as wide viewing angle and improved image contrast, it has been used more in recent years.

As the liquid crystal display apparatus of the FFS mode, the apparatus in which a common electrode and a pixel electrode are both disposed on the array substrate and above TFTs has been known. In the liquid crystal display apparatus with the structure like this, surfaces of the TFT and others are covered with an interlayer resin film in the array substrate, and a lower electrode made of a transparent conductive material and an upper electrode having a slit-like aperture are formed on the surface of the interlayer resin film with interposing an inter-electrode insulating film therebetween.

On the other hand, in the part between each of the pixels on the liquid crystal layer side of the color filter substrate, a light shielding portion is formed. Japanese Patent Application Laid-Open Publication No. 2011-164369 (Patent Document 1) and Japanese Patent Application Laid-Open Publication No. 2011-27951 (Patent Document 2) describe the technology of forming a light shielding portion at a position on a color filter substrate opposed to a scanning line and a signal line in the liquid crystal display apparatus of the FFS mode.

SUMMARY

In the liquid crystal display apparatus of the FFS mode described above, a photo spacer (spacer portion) for maintaining a space between an array substrate and a color filter substrate and keeping a liquid crystal layer at a predetermined thickness is formed. The photo spacer (spacer portion) is formed on, for example, the color filter substrate.

On the array substrate, a plurality of scanning lines (gate wiring) and a plurality of signal lines (source wiring) intersecting with each other are formed, and a TFT (Thin-Film Transistor) is provided at each intersecting portion of the scanning line (gate wiring) and the signal line (source wiring). In order to prevent the decrease of the aperture ratio of the pixel, the photo spacer (spacer portion) is provided at the intersecting portion of the source wiring and the gate wiring when seen in a plan view, and is formed at a position overlapped with the TFT (Thin-Film Transistor) in some cases.

Also, on each of an outermost surface on the liquid crystal layer side of the array substrate and an outermost surface on the liquid crystal layer side of the color filter substrate, an alignment film for aligning the liquid crystal layer is formed. In the process of forming this alignment film, for example, a rubbing roller is used to perform the rubbing in an extending direction of the signal line (source wiring). However, the photo spacer (spacer portion) is formed in the color filter substrate. Therefore, in a region on a downstream side in the rubbing direction with respect to the photo spacer (spacer portion) on the outermost surface of the color filter substrate, a region in which the alignment film is not rubbed, that is, a rubbing shadow is formed. Since the alignment film cannot be sufficiently aligned in the region in which the alignment film is not rubbed, the orientation of the liquid crystal layer cannot be appropriately aligned, and the problem of light leakage from a part of pixels occurs when displaying black. As a result, the quality of the display image is lowered and the performance of the liquid crystal display apparatus is degraded.

To move the photo spacer (spacer portion) may be one way to prevent the occurrence of the light leakage like this. However, if the photo spacer (spacer portion) is moved, the width of pixel of the liquid crystal display apparatus is increased, so that it becomes impossible to satisfy the restriction conditions of pixel layout.

The present invention has been made for solving the above-described problem in the prior art, and an object of the present invention is to provide a liquid crystal display apparatus capable of reducing the light leakage due to the occurrence of so-called rubbing shadow while satisfying the restriction conditions of pixel layout, in a liquid crystal display apparatus in which a spacer portion is provided at an intersecting portion of a source wiring and a gate wiring when seen in a plan view.

The following is a brief description of an outline of the typical invention disclosed in the present application.

In a liquid crystal display apparatus according to a typical embodiment, a spacer portion for keeping a thickness of a liquid crystal layer is provided at an intersecting portion of a source wiring and a gate wiring when seen in a plan view, and a light shielding portion for spacer portion, which shields the spacer portion from light, is provided. The spacer portion is disposed in a region in which the light shielding portion for spacer portion is provided when seen in a plan view. Also, the source wiring has two bend portions which are bent in mutually different directions in the region in which the light shielding portion for spacer portion is provided when seen in a plan view.

The effects obtained by the typical invention disclosed in the present application will be briefly described below.

According to a typical embodiment, in a liquid crystal display apparatus in which a spacer portion is provided at an intersecting portion of a source wiring and a gate wiring when seen in a plan view, it is possible to reduce the light leakage due to the occurrence of so-called rubbing shadow while satisfying the restriction conditions of pixel layout.

Additional features and advantages are described herein, and will be apparent from the following Detailed Description and the figures.

DETAILED DESCRIPTION

In the embodiments described below, the invention will be described in a plurality of sections or embodiments when required as a matter of convenience. However, these sections or embodiments are not irrelevant to each other unless otherwise stated, and the one relates to the entire or a part of the other as a modification example, details, or a supplementary explanation thereof.

Also, in the embodiments described below, when referring to the number of elements (including number of pieces, values, amount, range, and the like), the number of the elements is not limited to a specific number unless otherwise stated or except the case where the number is apparently limited to a specific number in principle. The number larger or smaller than the specified number is also applicable.

Further, in the embodiments described below, it goes without saying that the components (including element steps) are not always indispensable unless otherwise stated or except the case where the components are apparently indispensable in principle. Similarly, in the embodiments described below, when the shape of the components, positional relation thereof, and the like are mentioned, the substantially approximate and similar shapes and the like are included therein unless otherwise stated or except the case where it is conceivable that they are apparently excluded in principle. The same goes for the numerical value and the range described above.

Hereinafter, embodiments of the present invention will be described in detail with reference to the accompanying drawings. Note that components having the same function are denoted by the same reference symbols throughout the drawings for describing the embodiments, and the repetitive description thereof will be omitted. Also, in the following embodiments, the descriptions of the same or similar components are not repeated in principle except when particularly necessary.

Furthermore, in some drawings used in the following embodiments, hatching is omitted even in a cross-sectional view so as to make the drawings easy to see. Also, hatching is used even in a plan view so as to make the drawings easy to see.

First Embodiment

Liquid Crystal Display Apparatus

A liquid crystal display apparatus 10 of the first embodiment of the present invention will be described with reference to drawings.

First, a general configuration of the liquid crystal display apparatus 10 of the first embodiment will be described with reference to FIG. 1 to FIG. 3.

Figure 1:
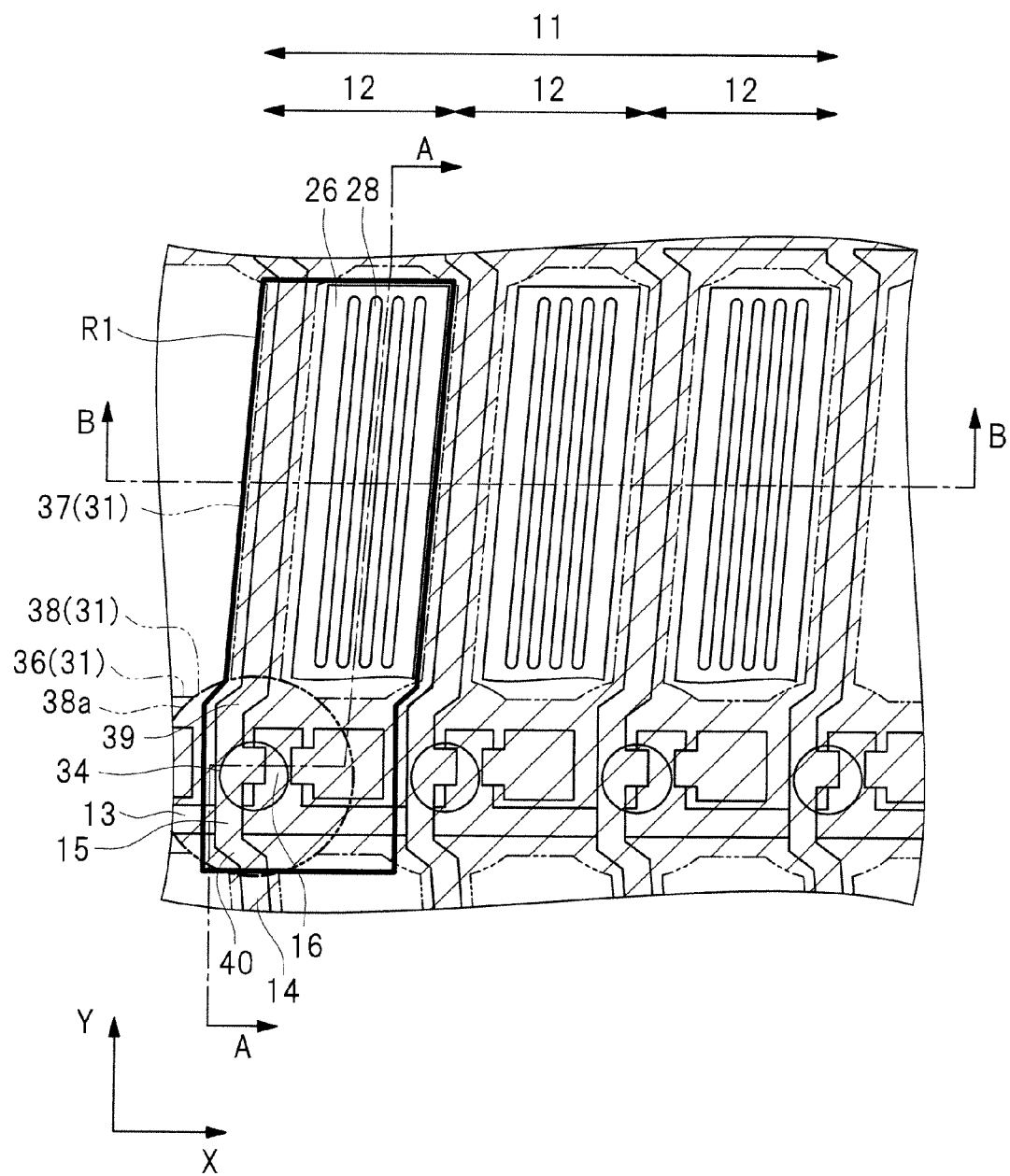
FIG. 1 is a plan view showing an outline of a liquid crystal display apparatus of the first embodiment.

FIG. 1 is a plan view showing an outline of the liquid crystal display apparatus of the first embodiment. FIG. 2 is a cross-sectional view taken along the line A-A in FIG. 1. FIG. 3 is a cross-sectional view taken along the line B-B in FIG. 1.

For example, the liquid crystal display apparatus 10 of the first embodiment is a liquid crystal display apparatus of an FFS mode utilizing a lateral electric field scheme for color display, and is provided with a plurality of pixels 11 as shown in FIG. 1. Also, in the configuration of the liquid crystal display apparatus 10 of the first embodiment, as shown in FIG. 2 and FIG. 3, a liquid crystal layer LC is sandwiched between an array substrate AR and a color filter substrate CF. More specifically, the liquid crystal display apparatus 10 includes the array substrate AR, the color filter substrate CF arranged so as to be opposed to the array substrate AR, and the liquid crystal layer LC sandwiched between the array substrate AR and the color filter substrate CF. The pixels 11 operate in the FFS mode and can use the liquid crystal layer LC in common. The plurality of pixels 11 are arranged in a row direction (X axis direction of FIG. 1) and a column direction (Y axis direction of FIG. 1). The pixel 11 is made up of, for example, subpixels 12 for displaying three colors of red (R), green (G) and blue (B), and the color of each pixel 11 is determined by the mixture of the lights of these colors.

FIG. 1 shows an example of three-color display, but the liquid crystal display apparatus 10 is not limited to the three-color display. For example, the pixel 11 may be made up of the subpixels 12 of two or less colors. Alternatively, the pixel 11 may be made up of the subpixels 12 of four or more colors (the same is true in the following embodiments).

In the specification of the present application, a region R1 is defined as a region corresponding to one subpixel 12, but one subpixel may be defined in a different manner as long as the definition is made so that periodical structure is repeated for each subpixel.

Also, FIG. 1 shows the state in which the part of the color filter substrate CF other than the photo spacer (spacer portion) 34 (see FIG. 2) is removed (transparent) for the sake of easy understanding (the same is true in FIG. 4 to FIG. 6, FIG. 13 and FIG. 15 to FIG. 18 below). Furthermore, FIG. 1 shows the state in which a gate insulating film 21 (see FIG. 2), a semiconductor layer 22 (see FIG. 2), an interlayer resin film (planarization film) 23 (see FIG. 2), a lower electrode 24 (see FIG. 2) and an inter-electrode insulating film 25 (see FIG. 2) of the array substrate AR are removed (transparent) for the sake of easy understanding (the same is true in FIG. 4 to FIG. 6, FIG. 13 and FIG. 15 to FIG. 18 below). Moreover, in FIG. 1, an outer periphery of a light shielding portion 31 (see FIG. 2) provided in the color filter substrate CF is illustrated by a two-point chain line for the sake of easy understanding (the same is true in FIG. 4 to FIG. 6 and FIG. 16 to FIG. 18 below). In addition, in FIG. 1, with respect to the photo spacer (spacer portion) 34, only the outer periphery thereof is illustrated by a solid line for the sake of easy understanding (the same is true in FIG. 4, FIG. 5 and FIG. 16 to FIG. 18 below).

As shown in FIG. 1, the subpixel 12 has a scanning line (gate wiring) 13 and a signal line (source wiring) 14 on the array substrate AR. The scanning line (gate wiring) 13 extends in the X axis direction and is made of, for example, opaque metal such as aluminum (Al) or molybdenum (Mo). The signal line (source wiring) 14 extends in the Y axis direction and is made of, for example, opaque metal such as aluminum (Al) or molybdenum (Mo). Also, the subpixel 12 has a TFT (Thin-Film Transistor) 16 provided on the array substrate AR and at an intersecting portion 15 of the scanning line (gate wiring) 13 and the signal line (source wiring) 14.

In the specification of the present application, the intersecting portion 15 is defined as including a portion at which the scanning line (gate wiring) 13 and the signal line (source wiring) 14 intersect and a portion around it, and it includes also the region in which the TFT (Thin-Film Transistor) 16 having a drain electrode DE is formed.

Also, the Y axis direction is a direction intersecting with the X axis direction, and the Y axis direction is preferably a direction orthogonal to the X axis direction.

Figure 2:
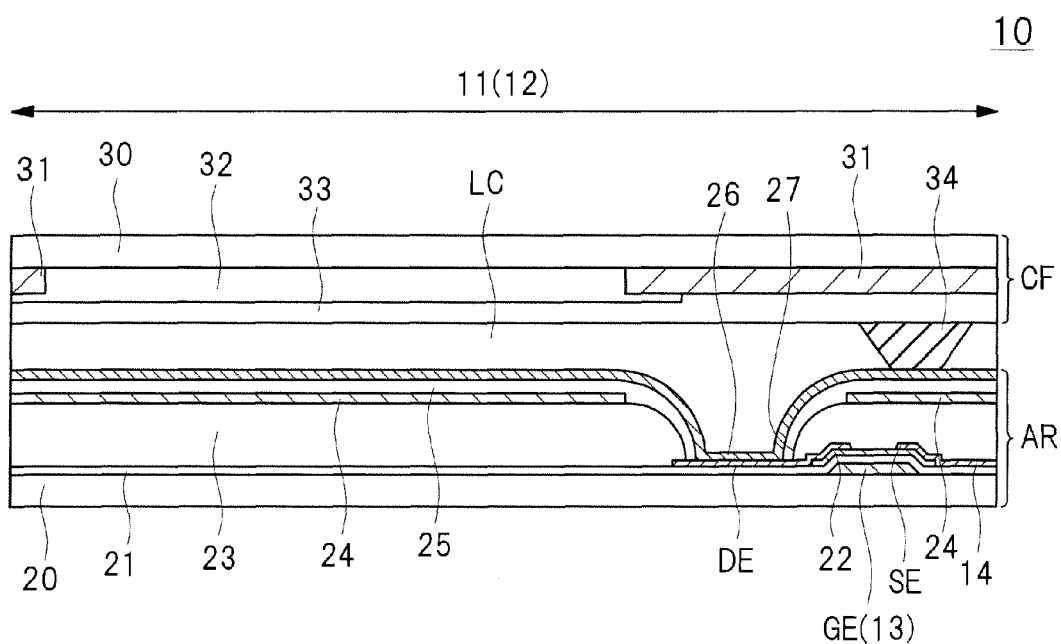
FIG. 2 is a cross-sectional view taken along the line A-A in FIG. 1.
Figure 3:
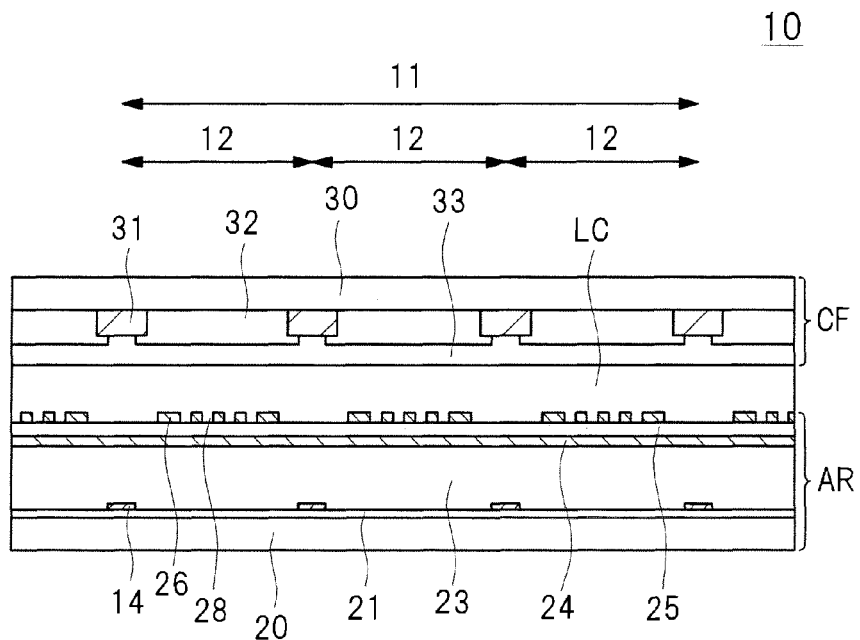
FIG. 3 is a cross-sectional view taken along the line B-B in FIG. 1.

As shown in FIG. 2 and FIG. 3, the array substrate AR has a first transparent substrate 20 as a base substrate. The first transparent substrate 20 is made of a transparent insulating material such as glass, quartz, or plastic. Note that, in FIG. 2 and FIG. 3, hatchings of the first transparent substrate 20, the gate insulating film 21, the interlayer resin film (planarization film) 23 and the inter-electrode insulating film 25 are omitted so as to make the drawings easy to see (the same is true in FIG. 7 and FIG. 8 to FIG. 10 below).

On the first transparent substrate 20, the scanning line (gate wiring) 13 is formed on a side facing the liquid crystal layer LC. As described above, the scanning line (gate wiring) 13 extends in the row direction (X axis direction) and is made of, for example, opaque metal such as aluminum (Al) or molybdenum (Mo). A gate electrode GE extends from the scanning line (gate wiring) 13.

A transparent gate insulating film 21 made of, for example, silicon nitride or silicon oxide is stacked (formed) so as to cover the scanning line (gate wiring) 13 and the gate electrode GE. Also, on the gate insulating film 21 overlapped with the gate electrode GE when seen in a plan view, a semiconductor layer 22 made of, for example, amorphous silicon or polycrystalline silicon is formed.

On the gate insulating film 21, the signal line (source wiring) 14 is formed. As described above, the signal line (source wiring) 14 extends in the column direction (Y axis direction) and is made of, for example, opaque material such as aluminum (Al) or molybdenum (Mo). A source electrode SE extends from the signal line (source wiring) 14. The source electrode SE is partially in contact with a surface of the semiconductor layer 22.

On the gate insulating film 21, the drain electrode DE made of the same material as the signal line (source wiring) 14 and formed simultaneously therewith is provided. The drain electrode DE is disposed near the source electrode SE and is partially in contact with the semiconductor layer 22.

When seen in a plan view, the region surrounded by the adjacent two scanning lines (gate wiring) 13 and the adjacent two signal lines (source wiring) 14 delimits the subpixel 12. More specifically, the subpixel 12 is demarcated by the adjacent two scanning lines (gate wiring) 13 and the adjacent two signal lines (source wiring) 14. Then, in the subpixel 12, the gate electrode GE, the gate insulating film 21, the semiconductor layer 22, the source electrode SE and the drain electrode DE constitute the TFT 16 serving as a switching element.

Further, the interlayer resin film (planarization film) 23 made of, for example, a transparent resin material such as photoresist is stacked (formed) so as to cover exposed portions of the signal line (source wiring) 14, the TFT 16 and the gate insulating film 21. More specifically, the interlayer resin film (planarization film) 23 is formed on the TFT 16 including the drain electrode DE. The interlayer resin film (planarization film) 23 covers the exposed portions of the signal line (source wiring) 14, the TFT 16 and the gate insulating film 21, and planarizes uneven surfaces of the signal line (source wiring) 14, the TFT 16 and the gate insulating film 21.

Note that, as an underlayer of the interlayer resin film (planarization film) 23, for example, a transparent passivation film made of silicon nitride or silicon oxide can be stacked (formed) so as to cover all or part of the exposed portions of the signal line (source wiring) 14, the TFT 16 and the gate insulating film 21. Furthermore, the interlayer resin film (planarization film) 23 can be stacked (formed) so as to cover the passivation film.

The lower electrode 24 made of a transparent conductive material such as ITO (Indium Tin Oxide) or IZO (Indium Zinc Oxide) is formed so as to cover the interlayer resin film (planarization film) 23. The lower electrode 24 is integrally and continuously formed in an approximately entire transparent region including the region of each subpixel 12, and operates as a common electrode.

The transparent inter-electrode insulating film 25 made of, for example, silicon nitride or silicon oxide is stacked (formed) so as to cover the lower electrode 24. Also, the upper electrode 26 made of, for example, a transparent conductive material such as ITO or IZO is formed so as to cover the inter-electrode insulating film 25. The upper electrode 26 is formed at a position overlapped with the lower electrode 24 in each subpixel 12 when seen in a plan view. More specifically, in the subpixel 12, the lower electrode 24 and the upper electrode 26 are opposed to each other with interposing (via) the inter-electrode insulating film 25 therebetween.

In the subpixel 12, a contact hole 27 which penetrates through the inter-electrode insulating film 25 and the interlayer resin film (planarization film) 23 to reach the drain electrode DE of the TFT 16 is formed at a position overlapped with the drain electrode DE when seen in a plan view. At a bottom portion of the contact hole 27, the drain electrode DE is exposed. The upper electrode 26 is electrically connected to the drain electrode DE exposed at the bottom portion of the contact hole 27. Therefore, the upper electrode 26 operates as a pixel electrode.

Note that, in FIG. 1, for the sake of easy understanding, only a part of the upper electrode 26 is shown (the same is true in FIG. 4, FIG. 5, and FIG. 16 to FIG. 18 below). Also, in the illustration in FIG. 1, an edge portion of the upper electrode 26 is not overlapped with the light shielding portion 31 described later for the sake of easy understanding, but it is also possible to form the upper electrode 26 so that the edge portion of the upper electrode 26 is overlapped with the light shielding portion 31 (the same is true in FIG. 4, FIG. 5, and FIG. 16 to FIG. 18 below).

Also, an alignment film (not shown) made of, for example, polyimide is stacked (formed) so as to cover the upper electrode 26. In this alignment film, the rubbing process is performed in a positive direction in the Y axis direction of FIG. 1.

Slit-like apertures 28 extending in an extending direction of the signal line (source wiring) 14 are formed in the upper electrode 26 formed in the subpixel 12. When the X axis direction is defined as a lateral direction and the Y axis direction is defined as a longitudinal direction, the subpixel 12 has an elongated shape whose length in the lateral direction is shorter than the length in the longitudinal direction. Therefore, when the slit-like apertures 28 are formed to extend in the lateral direction, the number of both ends of the slit-like apertures 28 is increased. The end portions of the slit-like apertures 28 become abnormal alignment regions of liquid crystal molecules and cause the decrease of the aperture ratio. Therefore, in the liquid crystal display apparatus 10 of the first embodiment, as shown in FIG. 1, the extending direction of the slit-like apertures 28 is made closer to the Y axis direction rather than the X axis direction, thereby reducing the number of end portions of the slit-like apertures 28 to suppress the decrease of the aperture ratio.

The color filter substrate CF uses a second transparent substrate 30 as a base substrate thereof. The second transparent substrate 30 is made of a transparent insulating material such as glass, quartz, or plastic. In the subpixel 12, a light shielding portion (black matrix) 31 having a light shielding property and made of, for example, resin or metal is formed at a position opposed to the scanning line (gate wiring) 13 and the signal line (source wiring) 14. Also, in the subpixels 12, color filter layers 32 through which lights of different colors (for example, red (R), green (G) and blue (B)) pass are formed for each of the subpixels 12. Therefore, the light shielding portion (black matrix) 31 is provided between the subpixels 12 each having the color filter layer 32 formed therein. Note that, in FIG. 2 and FIG. 3, hatchings of the second transparent substrate 30, the color filter layer 32 and an overcoat layer 33 are omitted so as to make the drawings easy to see (the same is true in FIG. 7, FIG. 11 and FIG. 12 below).

Note that the ratio of the area occupied by the part not covered by the light shielding portion 31 in the area of the subpixel 12 (area of the region R1) corresponds to the aperture ratio.

The overcoat layer 33 made of, for example, a transparent resin material such as photoresist is stacked (formed) so as to cover the light shielding portion 31 and the color filter layer 32 of each subpixel 12. The overcoat layer 33 of each subpixel 12 is formed so as to planarize the unevennesses due to the color filter layers 32 of different colors and prevent foreign materials from the light shielding portion 31 and the color filter layer 32 from entering the liquid crystal layer LC.

On the overcoat layer 33, the photo spacer (spacer portion) 34 for maintaining a space between the array substrate AR and the color filter substrate CF and keeping the liquid crystal layer LC at a predetermined thickness is formed. The photo spacer (spacer portion) 34 is made of, for example, a transparent resin material such as photoresist. Then, an alignment film (not shown) made of, for example, polyimide is formed so as to cover the overcoat layer 33 and the photo spacer (spacer portion) 34. In this alignment film (not shown) formed in the color filter substrate CF, the rubbing process in the direction reverse to that of the alignment film (not shown) formed in the array substrate AR is performed.

The array substrate AR and the color filter substrate CF described above are disposed so as to be opposed to each other (opposed disposition) via the photo spacer (spacer portion) 34 for maintaining a space between the array substrate AR and the color filter substrate CF. Also, though not shown, a sealing member is provided between an outer peripheral portion of the array substrate AR and an outer peripheral portion of the color filter substrate CF. Then, the space between the array substrate AR and the color filter substrate CF disposed so as to be opposed to each other (opposed disposition) is filled with, for example, the liquid crystal layer LC of homogeneous alignment. Note that, in FIG. 2 and FIG. 3, hatching of the liquid crystal layer LC is omitted so as to make the drawings easy to see (the same is true in FIG. 7 below).

In the example shown in FIG. 1, the photo spacer (spacer portion) 34 is provided so as to correspond to all of the subpixels 12, but it is not always necessary to provide the photo spacer (spacer portion) 34 so as to correspond to all of the subpixels 12. For example, one photo spacer (spacer portion) 34 may be provided for each two subpixels 12 arranged in the extending direction (X axis direction) of the scanning line (gate wiring) 13. Also, one photo spacer (spacer portion) 34 may be provided for each three subpixels 12 arranged in the extending direction (X axis direction) of the scanning line (gate wiring) 13. Alternatively, one photo spacer (spacer portion) 34 may be provided for each two or more subpixels 12 arranged in the extending direction (Y axis direction) of the signal line (source wiring) 14.

In the configuration described above, when the TFT 16 is switched to an ON state, an electric field is generated between the lower electrode 24 and the upper electrode 26, and the orientation of the liquid crystal molecules of the liquid crystal layer LC is changed in the subpixel 12. In this manner, the light transmittance of the liquid crystal layer LC is changed and an image is displayed in the FFS mode. Also, the region in which the lower electrode 24 and the upper electrode 26 are opposed with interposing (via) the inter-electrode insulating film 25 therebetween forms an auxiliary capacitor, and retains the electric field between the lower electrode 24 and the upper electrode 26 for a predetermined time when the TFT 16 is switched to an OFF state.

Next, the two subpixels 12a and 12b adjacent in the Y axis direction in the liquid crystal display apparatus 10 of the first embodiment will be described in detail with reference to FIG. 4.

Figure 4:
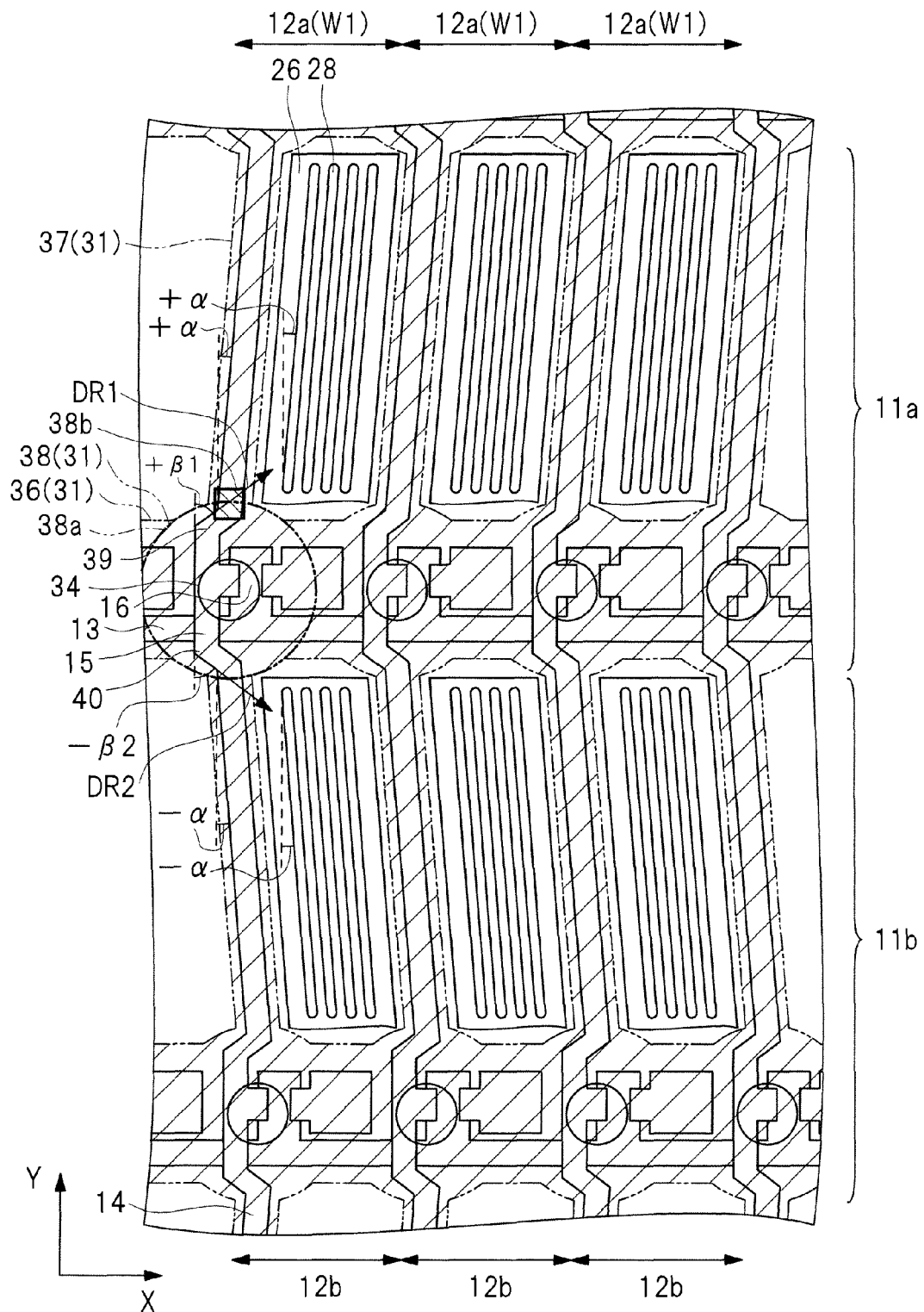
FIG. 4 is a plan view showing an outline of two pixels adjacent in a Y axis direction in the liquid crystal display apparatus of the first embodiment.

FIG. 4 is a plan view showing an outline of the two pixels adjacent in the Y axis direction in the liquid crystal display apparatus of the first embodiment.

The pixel 11a is made up of, for example, subpixels 12a for displaying three colors of red (R), green (G) and blue (B) and the pixel 11b is made up of, for example, subpixels 12b for displaying three colors of red (R), green (G) and blue (B). In this case, in the liquid crystal display apparatus 10 of the first embodiment, in the subpixel 12a of the subpixels 12a and 12b adjacent in the Y axis direction, the extending direction of the slit-like aperture 28 is tilted with respect to the rubbing direction (positive direction in the Y axis direction) by $+\alpha$ (clockwise direction is defined as positive and cc is defined as positive). Also, in the subpixel 12b, the extending direction of the slit-like aperture 28 is tilted with respect to the rubbing direction (positive direction in the Y axis direction) by $-\alpha$. More specifically, the extending direction of the slit-like aperture 28 in the subpixel 12b is different from the extending direction of the slit-like aperture 28 in the subpixel 12a.

When all of the slit-like apertures 28 are tilted in a clockwise direction or anticlockwise direction with respect to the rubbing direction (positive direction in the Y axis direction), since the liquid crystal molecules are twisted in one direction, the phenomenon in which color changes depending on the viewing direction occurs. This is because the apparent hue difference (retardation) is changed depending on the direction of seeing the liquid crystal molecules. Therefore, in the liquid crystal display apparatus 10 of the first embodiment, in order to reduce the hue difference (retardation) caused depending on the direction of seeing the liquid crystal molecules, the extending directions of the slit-like apertures 28 in the subpixels 12a and 12b adjacent in the Y axis direction are tilted with respect to the rubbing direction (positive direction in the Y axis direction) by $+\alpha$ and $-\alpha$, respectively. The tilt angle can be set to, for example, 5 degrees.

Also, in conjunction with the extending direction of the slit-like aperture 28, the signal lines (source wiring) 14 in the subpixel 12a and the subpixel 12b adjacent in the Y axis direction also extend in the direction tilted with respect to the rubbing direction (positive direction in the Y axis direction) by the angle of $+\alpha$ and $-\alpha$. More specifically, in the liquid crystal display apparatus 10 of the first embodiment, the signal line (source wiring) 14 in the subpixel 12a extends in the direction tilted with respect to the rubbing direction (positive direction in the Y axis direction) by the angle of $+\alpha$ (as described above, clockwise direction is defined as positive and $\alpha$ is defined as positive). Also, the signal line (source wiring) 14 in the subpixel 12b extends in the direction tilted with respect to the rubbing direction (positive direction in the Y axis direction) by the angle of $-\alpha$. As a result, the signal line (source wiring) 14 is bent with respect to the Y axis direction by the angle of $2\alpha$ at front and back of the intersecting portion 15 of the subpixel 12a.

By forming the signal line (source wiring) 14 to have the shape corresponding to the shape of the slit-like aperture 28, the upper electrode 26 can also be formed to have the external shape corresponding to the shape of the slit-like aperture 28 and the signal line (source wiring) 14. Therefore, the direction and intensity of the electric field generated between the upper electrode 26 and the lower electrode 24 can be made uniform in one subpixel.

Next, the signal line (source wiring) 14, the light shielding portion 31 and the photo spacer (spacer portion) 34 of the liquid crystal display apparatus 10 of the first embodiment will be described in detail with reference to FIG. 1, FIG. 4 and FIG. 5 to FIG. 7.

Figure 5:
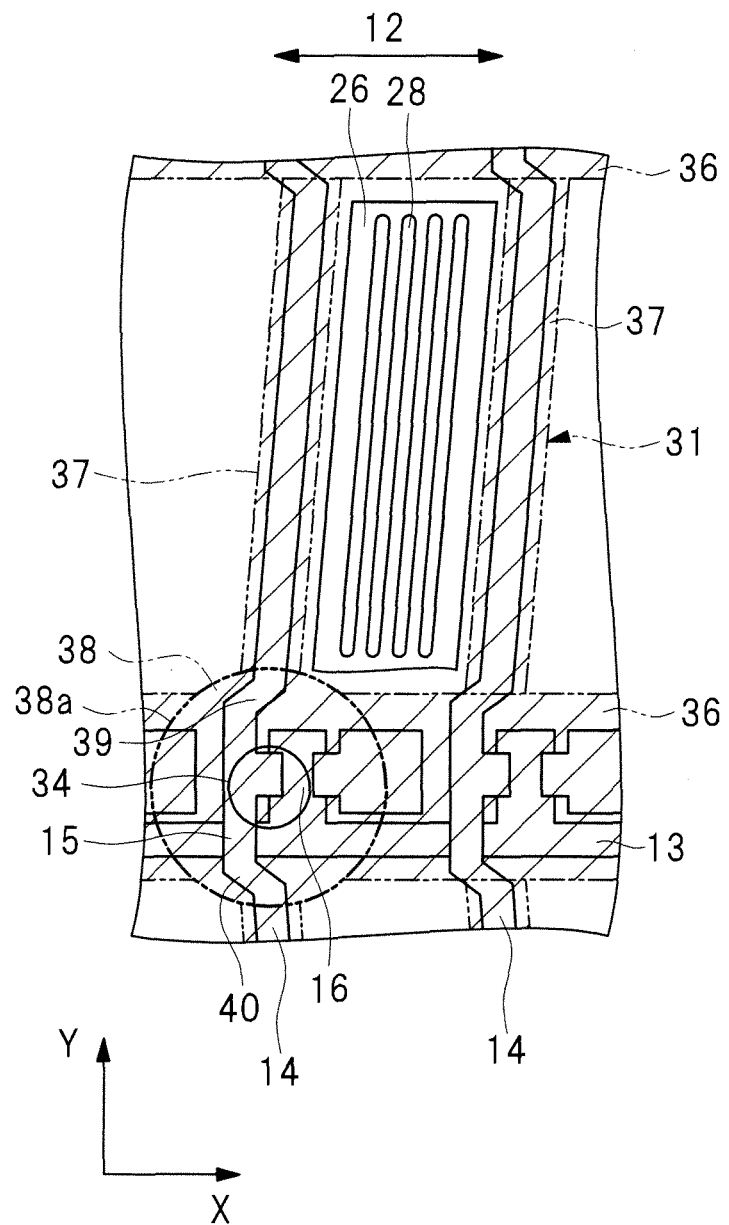
FIG. 5 is a plan view showing an outline of one subpixel in the liquid crystal display apparatus of the first embodiment.
Figure 6:
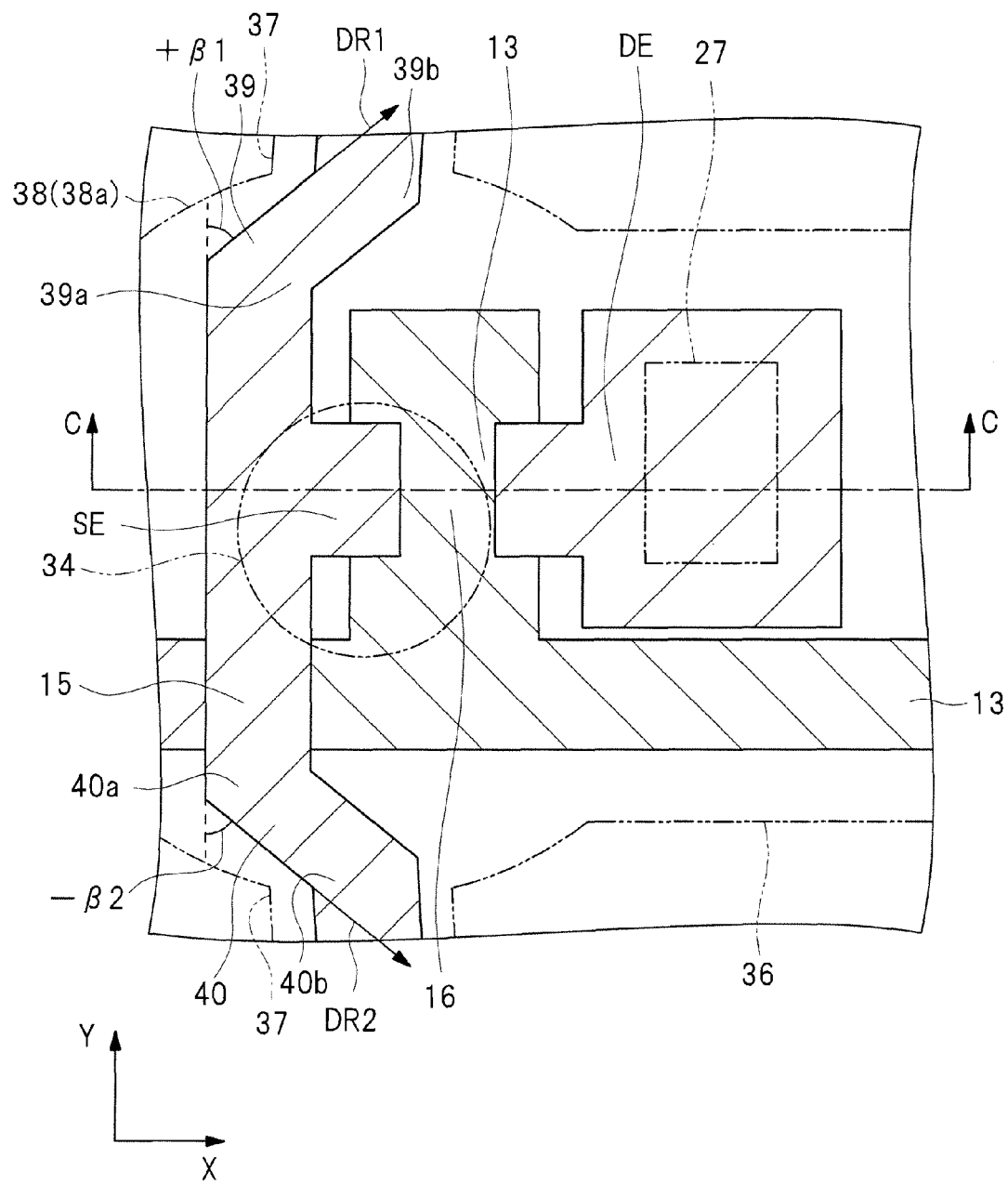
FIG. 6 is a plan view showing a part near an intersecting portion of a scanning line (gate wiring) and a signal line (source wiring) in one subpixel in the liquid crystal display apparatus of the first embodiment in an enlarged manner.
Figure 7:
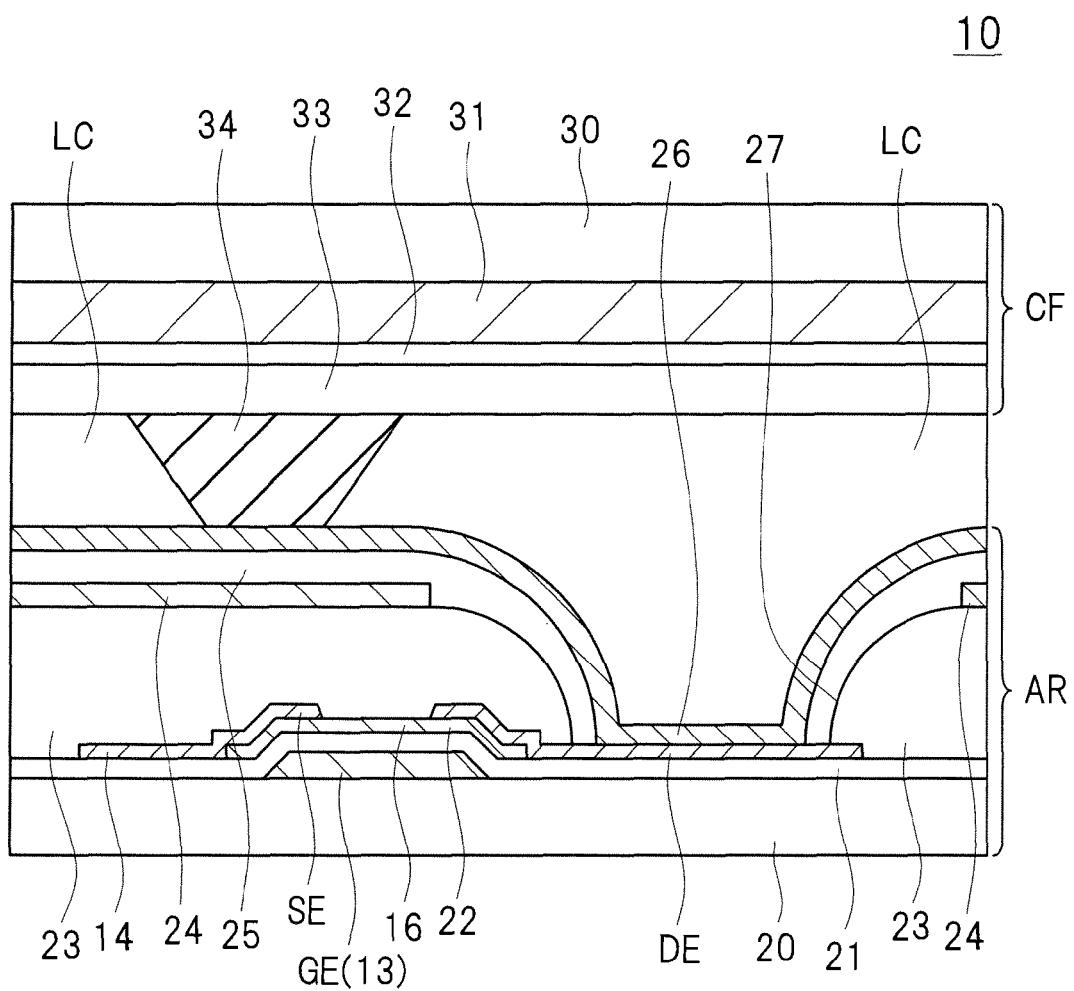
FIG. 7 is a cross-sectional view taken along the line C-C in FIG. 6.

FIG. 5 is a plan view showing an outline of one subpixel in the liquid crystal display apparatus of the first embodiment. FIG. 5 shows the region R1 corresponding to one subpixel 12 in FIG. 1. FIG. 6 is a plan view showing a part near the intersecting portion of the scanning line (gate wiring) and the signal line (source wiring) in one subpixel in the liquid crystal display apparatus of the first embodiment in an enlarged manner. FIG. 7 is a cross-sectional view taken along the line C-C in FIG. 6.

As described above, it is not always necessary to provide the photo spacer (spacer portion) 34 so as to correspond to all of the subpixels 12. Thus, for the sake of easy understanding, an example in which no photo spacer (spacer portion) 34 is provided in the subpixel adjacent to the subpixel 12 having the photo spacer (spacer portion) 34 provided therein in the extending direction (X axis direction) of the scanning line (gate wiring) 13 will be described with reference to FIG. 5. Also, in the example shown in FIG. 5, no photo spacer (spacer portion) 34 is provided also in the subpixel adjacent to the subpixel 12 having the photo spacer (spacer portion) 34 provided therein in the extending direction (Y axis direction) of the signal line (source wiring) 14.

As described above, in the first embodiment, the photo spacer (spacer portion) 34 for maintaining a space between the array substrate AR and the color filter substrate CF is formed on a side of the color filter substrate CF facing the liquid crystal layer LC, that is, on the array substrate AR side of the color filter substrate CF. Also, in order to prevent the decrease of the aperture ratio of the pixel, the photo spacer (spacer portion) 34 is provided at the intersecting portion 15 of the scanning line (gate wiring) 13 and the signal line (source wiring) 14.

As shown in FIG. 1, FIG. 4 and FIG. 5, the light shielding portion 31 includes a light shielding portion 36 for gate wiring and a light shielding portion 37 for source wiring. The light shielding portion 36 for gate wiring is provided at a position opposed to the scanning line (gate wiring) 13 provided along the X axis direction and the TFT 16 provided at the intersecting portion 15. The light shielding portion 37 for source wiring is provided at a position opposed to the signal line (source wiring) 14 provided in the Y axis direction. Therefore, each subpixel 12 is surrounded by the light shielding portion 36 for gate wiring and the light shielding portion 37 for source wiring.

In the first embodiment, the light shielding portion 31 further includes a light shielding portion 38 for spacer portion. The photo spacer (spacer portion) 34 is disposed in a region in which the light shielding portion 38 for spacer portion is provided when seen in a plan view. More specifically, the light shielding portion 38 for spacer portion is disposed so that the region in which the photo spacer (spacer portion) 34 is provided is included in the region in which the light shielding portion 38 for spacer portion is provided when seen in a plan view. Also, the light shielding portion 38 for spacer portion is partly provided in the region outside the region in which the light shielding portion 36 for gate wiring or the light shielding portion 37 for source wiring is provided when seen in a plan view. In other words, the light shielding portion 38 for spacer portion increases the area of the light shielding portion 31 in comparison with the case where the light shielding portion 31 is made up of only the light shielding portion 36 for gate wiring and the light shielding portion 37 for source wiring.

As shown in FIG. 5 to FIG. 7, the photo spacer (spacer portion) 34 preferably has a truncated conical shape so that the stress applied to the photo spacer (spacer portion) 34 is axisymmetrically uniform, that is, uniform in a circumferential direction of the photo spacer (spacer portion) 34 when seen in a plan view. In such a case, the planar shape of the light shielding portion 38 for spacer portion is preferably a circular shape. More preferably, the center of the light shielding portion 38 for spacer portion whose planar shape is a circular shape coincides with the center of the photo spacer (spacer portion) 34 when seen in a plan view. In this manner, even when the orientation of the liquid crystal layer is disordered around the photo spacer (spacer portion) 34, the light leakage can be surely blocked even if the liquid crystal molecules are seen from any direction.

In the first embodiment, the signal line (source wiring) 14 has a bend portion 39 and a bend portion 40 that are bent in mutually different directions at the positions apart from each other in the region 38a in which the light shielding portion 38 for spacer portion is provided when seen in a plan view. The bend portion 39 is bent in a direction DR1 which is tilted with respect to the positive direction in the Y axis direction from the positive direction in the Y axis direction in the region 38a in which the light shielding portion 38 for spacer portion is provided when seen in a plan view. Also, the bend portion 40 is bent in a direction DR2 which is different from the direction DR1 and is tilted with respect to the positive direction in the Y axis direction from the positive direction in the Y axis direction in the region 38a in which the light shielding portion 38 for spacer portion is provided when seen in a plan view.

As described above with reference to FIG. 4, in conjunction with the tilt of the slit-like aperture 28 for reducing the occurrence of the hue difference (retardation) caused depending on the direction of seeing the liquid crystal molecules, the signal line (source wiring) 14 is bent with respect to the Y axis direction by the angle of $2\alpha$ at front and back of the intersecting portion 15 of the subpixel 12a. Separately from the bend for reducing the hue difference (retardation) like this, the bend portion 39 and the bend portion 40 are provided in the signal line (source wiring) 14 in the region 38a in which the light shielding portion 38 for spacer portion is provided. In this manner, while satisfying the restriction conditions of the pixel layout, the light leakage caused by the occurrence of the so-called rubbing shadow described later can be reduced and the performance of the liquid crystal display apparatus can be improved.

Furthermore, preferably, as shown in FIG. 6, the bend portion 39 is bent twice alternately in reverse directions at positions 39a and 39b when seen in a plan view, and the bend portion 40 is preferably bent twice alternately in reverse directions at positions 40a and 40b when seen in a plan view. For example, the bend portion 39 is bent in the direction DR1 from the positive direction in the Y axis direction at the position 39a when seen in a plan view and bent in the direction tilted by the angle of $+\alpha$ (see FIG. 4) with respect to the positive direction in the Y axis direction from the direction DR1 at the position 39b when seen in a plan view. Also, for example, the bend portion 40 is bent in the direction DR2 from the negative direction in the Y axis direction at the position 40a when seen in a plan view and bent in the direction tilted by the angle of $-\alpha$ (see FIG. 4) with respect to the negative direction in the Y axis direction from the direction DR2 at the position 40b when seen in a plan view. At this time, when the tilt angle of the direction DR1 with respect to the positive direction in the Y axis direction is defined as $+\beta1$ (clockwise direction is defined as positive and $\beta1$ is defined as positive), $\beta1$ is larger than $\alpha$. Also, when the tilt angle of the direction DR2 with respect to the negative direction in the Y axis direction is defined as $-\beta2$ (clockwise direction is defined as positive and $\beta2$ is defined as positive), $\beta2$ is larger than $\alpha$. When such a relation is satisfied, the bend portion 39 is bent twice in reverse directions at the positions 39a and 39b when seen in a plan view, and the bend portion 40 is bent twice in reverse directions at the positions 40a and 40b when seen in a plan view.

As described above, by bending twice alternately in reverse directions in each of the bend portion 39 and the bend portion 40, the extending direction of the signal line (source wiring) 14 in the region 38a in which the light shielding portion 38 for spacer portion is provided can be made approximately parallel with the Y axis direction, and the position of the intersecting portion 15 can be moved in the X axis direction. Consequently, while satisfying the restriction conditions of the pixel layout, the light leakage caused by the occurrence of the so-called rubbing shadow described later can be further reduced, and the performance of the liquid crystal display apparatus can be further improved.

Note that, as shown in FIG. 1 and FIG. 4, the signal line (source wiring) 14 is disposed in the region in which the light shielding portion 31 made up of the light shielding portion 36 for gate wiring, the light shielding portion 37 for source wiring and the light shielding portion 38 for spacer portion is provided when seen in a plan view. Accordingly, it is possible to suppress the decrease of the aperture ratio.

<Manufacturing Process of Liquid Crystal Display Apparatus>

A manufacturing process of the liquid crystal display apparatus 10 of the first embodiment will be described with reference to FIG. 8 to FIG. 12. FIG. 8 to FIG. 12 are cross-sectional views showing the principal part in the manufacturing process of the liquid crystal display apparatus of the first embodiment. Note that FIG. 8 to FIG. 12 show the cross sections corresponding to the cross section shown in FIG. 7.

Figure 8:
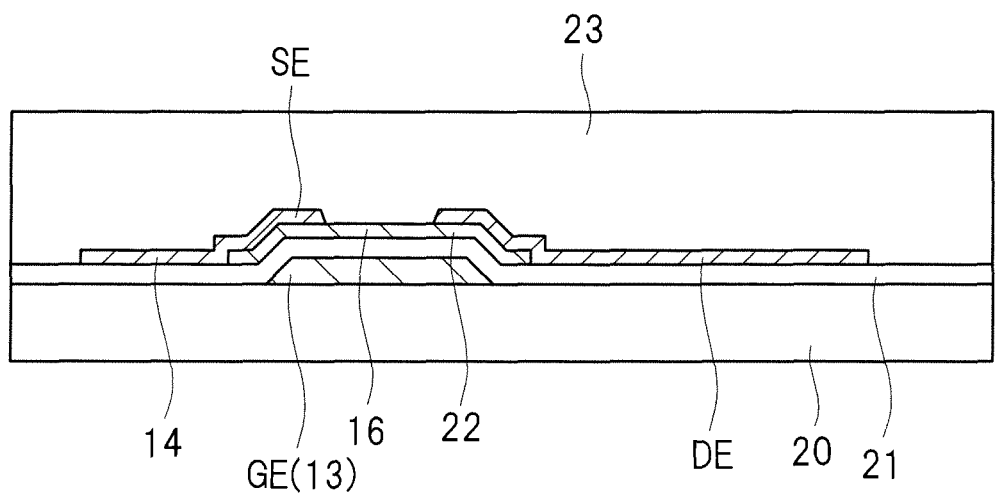
FIG. 8 is a cross-sectional view showing the principal part in the manufacturing process of the liquid crystal display apparatus of the first embodiment.

First, as shown in FIG. 8, the gate electrode GE and the scanning line (gate wiring) 13 made up of, for example, an Al layer and an Mo layer formed in this order from below are formed by the photolithography and the etching on the front surface (first main surface) of the first transparent substrate 20.

Next, as shown in FIG. 8, the gate insulating film 21 made of, for example, silicon nitride is formed on the gate electrode GE and the first transparent substrate 20 by the CVD (Chemical Vapor Deposition) method. Then, the semiconductor layer 22 having the two-layer structure of an a-Si layer and an n$^+$Si with an n type conductivity is formed by the photolithography and the etching so as to be overlapped with the gate electrode GE via the gate insulating film 21 when seen in a plan view.

Next, as shown in FIG. 8, the source electrode SE, the signal line (source wiring) 14 and the drain electrode DE made up of an Mo layer, an Al layer and an Mo layer formed in this order from below are formed on the semiconductor layer 22 so as to be overlapped with the gate electrode GE and the semiconductor layer 22 when seen in a plan view and to be electrically connected to the semiconductor layer 22. In this manner, the TFT (Thin-Film Transistor) 16 is formed.

Next, as shown in FIG. 8, the interlayer resin film (planarization film) 23 is formed so as to cover all or part of the exposed portions of the source electrode SE, the drain electrode DE and the gate insulating film 21. For example, the interlayer resin film (planarization film) 23 as a protection film made of acrylic photosensitive resin is formed by the coating method.

Note that, as an underlayer of the interlayer resin film (planarization film) 23, for example, a transparent passivation film made of silicon nitride or silicon oxide can be stacked (formed) so as to cover all or part of the exposed portions of the signal line (source wiring) 14, the TFT 16 and the gate insulating film 21. Furthermore, the interlayer resin film (planarization film) 23 can be stacked (formed) so as to cover the passivation film.

Figure 9:
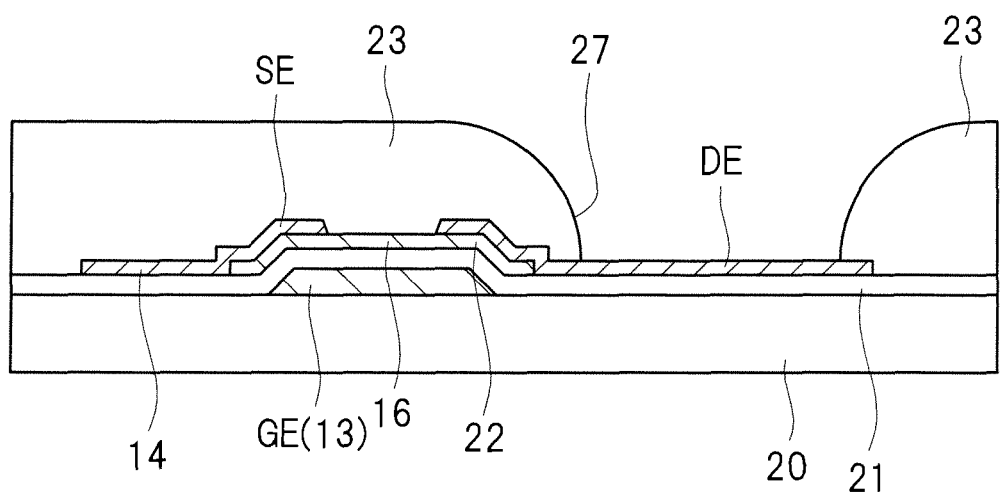
FIG. 9 is a cross-sectional view showing the principal part in the manufacturing process of the liquid crystal display apparatus of the first embodiment.

Next, as shown in FIG. 9, the portion of the interlayer resin film (planarization film) 23 formed on the drain electrode DE is removed by the photolithography and the etching, thereby forming the contact hole 27. In this manner, as shown in FIG. 9, the drain electrode DE is exposed at the bottom portion of the contact hole 27.

Figure 10:
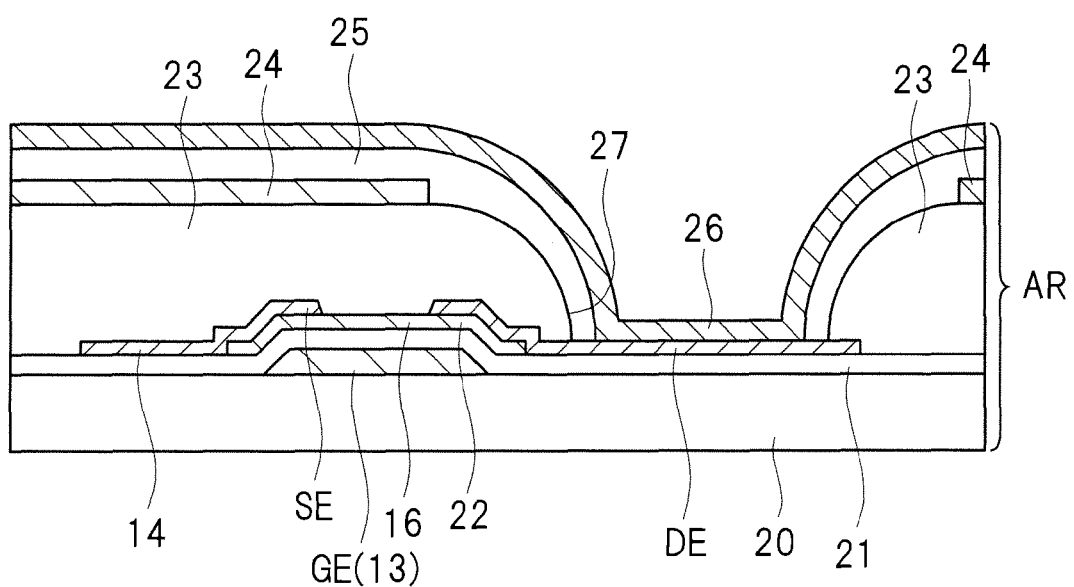
FIG. 10 is a cross-sectional view showing the principal part in the manufacturing process of the liquid crystal display apparatus of the first embodiment.

Next, as shown in FIG. 10, the lower electrode 24 made of, for example, ITO or IZO is formed by the sputtering method on the interlayer resin film (planarization film) 23. Then, the portion of the lower electrode 24 formed on the contact hole 27 is removed by the photolithography and the etching. In this manner, the interlayer resin film (planarization film) 23 is exposed on the contact hole 27, and the surface of the drain electrode DE is exposed at the bottom portion of the contact hole 27.

Next, as shown in FIG. 10, the inter-electrode insulating film 25 made of, for example, silicon nitride is formed by the CVD method so as to cover the exposed portions of the lower electrode 24 and the interlayer resin film (planarization film) 23 and the drain electrode DE exposed at the bottom portion of the contact hole 27. Then, the portion of the inter-electrode insulating film 25 formed on the contact hole 27 is removed by the photolithography and the etching. In this manner, the surface of the drain electrode DE is exposed at the bottom portion of the contact hole 27.

Next, as shown in FIG. 10, the upper electrode 26 made of, for example, ITO or IZO is formed by the sputtering method so as to cover the inter-electrode insulating film 25 and the drain electrode DE exposed at the bottom portion of the contact hole 27. At this time, a part of the upper electrode 26 is formed on the drain electrode DE exposed at the bottom portion of the contact hole 27. Therefore, the upper electrode 26 and the drain electrode DE are electrically connected to each other through the contact hole 27. Then, though not shown in FIG. 10, the slit-like aperture 28 (see FIG. 3) is formed in the formed upper electrode 26 by the photolithography and etching. Thereafter, though not shown in FIG. 10, the alignment film made of polyimide or the like is formed on the upper electrode 26 by, for example, the coating method. In this manner, the array substrate AR of the liquid crystal display apparatus 10 is formed.

Figure 11:
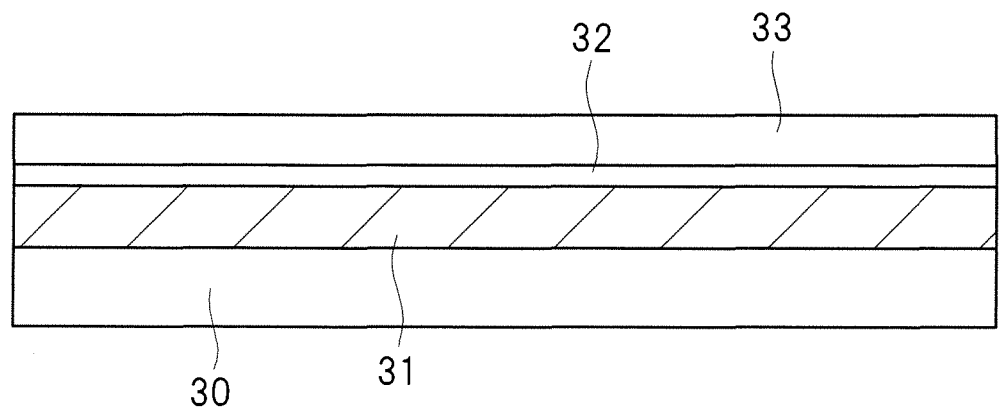
FIG. 11 is a cross-sectional view showing the principal part in the manufacturing process of the liquid crystal display apparatus of the first embodiment.

On the other hand, as shown in FIG. 11, a film made of, for example, a black resin material is formed on the front surface (first main surface) of the second transparent substrate 30, and is then etched, thereby forming the light shielding portion (black matrix) 31. Next, as shown in FIG. 11, the color filter layer 32 is formed for each subpixel 12 by the photolithography. Specifically, the color filter layer 32 of red (R), green (G) or B (blue) is formed for each subpixel 12 (see FIG. 1).

Next, as shown in FIG. 11, the overcoat layer 33 made of acrylic photosensitive resin is formed by, for example, the coating method on the light shielding portion (black matrix) 31 and the color filter layer 32. The overcoat layer 33 is formed so as to cover the light shielding portion (black matrix) 31 and the color filter layer 32.

Figure 12:
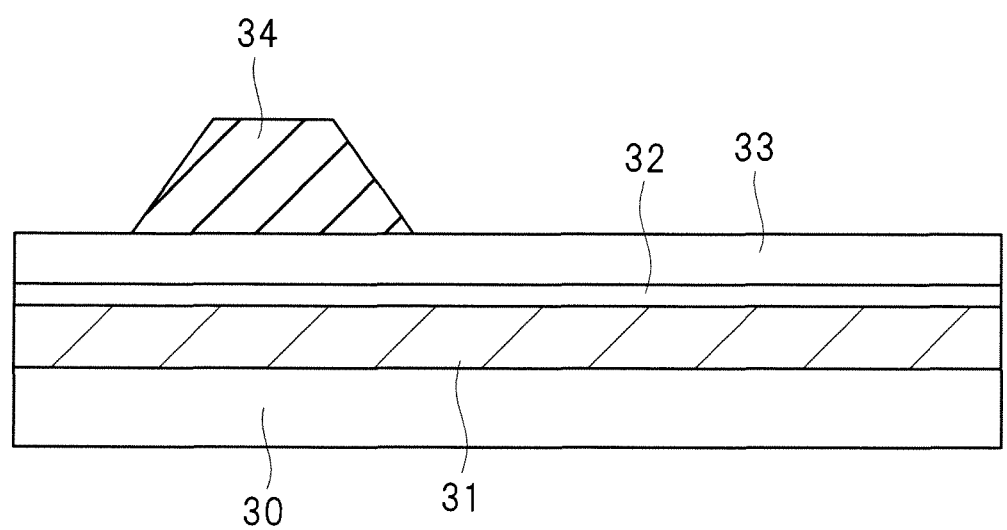
FIG. 12 is a cross-sectional view showing the principal part in the manufacturing process of the liquid crystal display apparatus of the first embodiment.

Next, as shown in FIG. 12, the photo spacer (spacer portion) 34 made of, for example, acrylic photosensitive resin is formed by the photolithography on the overcoat layer 33. Thereafter, though not shown in FIG. 12, the alignment film made of, for example, polyimide is formed on the surface of the overcoat layer 33 and the surface of the photo spacer (spacer portion) 34. In this manner, the color filter substrate CF of the liquid crystal display apparatus 10 is formed.

The array substrate AR and the color filter substrate CF formed in the above-described manner are disposed so that the front surfaces (first main surfaces), not the rear surfaces (second main surface) thereof, are opposed (opposed disposition). Then, by providing the sealing member (not shown) to the peripheral portions of the array substrate AR and the color filter substrate CF disposed to be opposed, the array substrate AR and the color filter substrate CF are adhered to each other. Thereafter, by filling the space between the array substrate AR and the color filter substrate CF with the liquid crystal of homogeneous alignment as the liquid crystal layer LC, the liquid crystal display apparatus 10 of the first embodiment can be obtained.

<Light Leakage Due to Occurrence of Rubbing Shadow>

Figure 13:
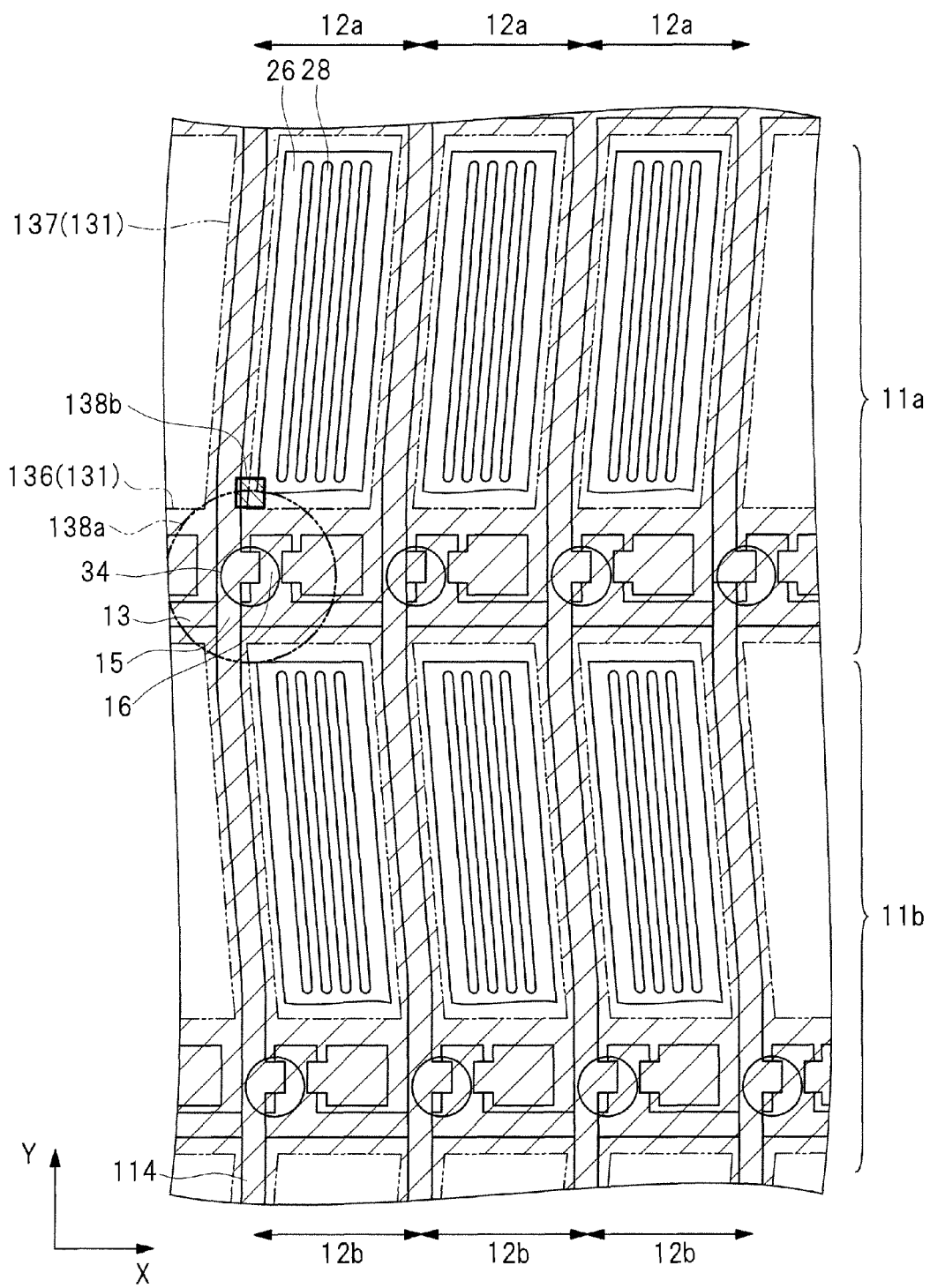
FIG. 13 is a plan view showing an outline of a liquid crystal display apparatus of a comparative example 1.

FIG. 13 is a plan view showing an outline of a liquid crystal display apparatus of a comparative example 1. In FIG. 13, an outer periphery of a light shielding portion 131 is illustrated by a two-point chain line for the sake of easy understanding (the same is true in FIG. 15 below). In addition, in FIG. 13, with respect to the photo spacer (spacer portion) 34, only the outer periphery thereof is illustrated by a solid line for the sake of easy understanding (the same is true in FIG. 15 below).

Since components other than the signal line (source wiring) 114 and the light shielding portion 131 of the liquid crystal display apparatus 110 of the comparative example 1 are the same as the components other than the signal line (source wiring) 14 and the light shielding portion 31 of the liquid crystal display apparatus 10 of the first embodiment, the descriptions thereof will be omitted.

Note that the array substrate AR and the first transparent substrate 20 of the liquid crystal display apparatus 110 of the comparative example 1 correspond to the array substrate AR and the first transparent substrate 20 of the liquid crystal display apparatus 10 of the first embodiment, respectively. Also, the pixel 11, the subpixel 12, the scanning line (gate wiring) 13, the intersecting portion 15, the TFT 16 and the photo spacer (spacer portion) 34 of the liquid crystal display apparatus 110 of the comparative example 1 correspond to the pixel 11, the subpixel 12, the scanning line (gate wiring) 13, the intersecting portion 15, the TFT 16 and the photo spacer (spacer portion) 34 of the liquid crystal display apparatus 10 of the first embodiment, respectively.

As shown in FIG. 13, in the liquid crystal display apparatus 110 of the comparative example 1, the light shielding portion 131 includes the light shielding portion 136 for gate wiring and the light shielding portion 137 for source wiring. However, the light shielding portion 131 does not include the light shielding portion for spacer portion which shields the photo spacer (spacer portion) 34 from light and increases the entire area of the light shielding portion 131 in comparison with the case where the light shielding portion 131 is made up of only the light shielding portion 136 for gate wiring and the light shielding portion 137 for source wiring. Also, the signal line (source wiring) 114 of the liquid crystal display apparatus 110 of the comparative example 1 has no bend portion in the region 138a corresponding to the region in which the light shielding portion 38 for spacer portion is provided in the first embodiment. Therefore, in the region 138a, the signal line (source wiring) 114 extends in the Y axis direction when seen in a plan view.

Also in the liquid crystal display apparatus 110 of the comparative example 1, the photo spacer (spacer portion) 34 is provided on the TFT 16 provided at the intersecting portion 15 when seen in a plan view. Also, since the signal line (source wiring) 114 is connected to the source electrode SE extended on the negative direction side in the X axis direction (−X direction side) from the TFT 116, the signal line (source wiring) 114 is provided on the negative direction side in the X axis direction (−X direction side) in comparison with the TFT 116. Therefore, the signal line (source wiring) 114 is provided on the negative direction side in the X axis direction (−X direction side) in comparison with the photo spacer (spacer portion) 34. Also, at the position opposed to the signal line (source wiring) 114, the light shielding portion 137 for source wiring is provided.

In such a case, in the liquid crystal display apparatus 110 of the comparative example 1, no signal line (source wiring) 114 is provided in the region 138b which is on the positive direction side in the Y axis direction (+Y direction side) in comparison with the photo spacer (spacer portion) 34 and is on the positive direction side in the Y axis direction (+Y direction side) in comparison with the light shielding portion 136 for gate wiring. Therefore, at least a part of the region 138b is not shielded from light by the light shielding portion 131 including the light shielding portion 136 for gate wiring and the light shielding portion 137 for source wiring.

Figure 14:
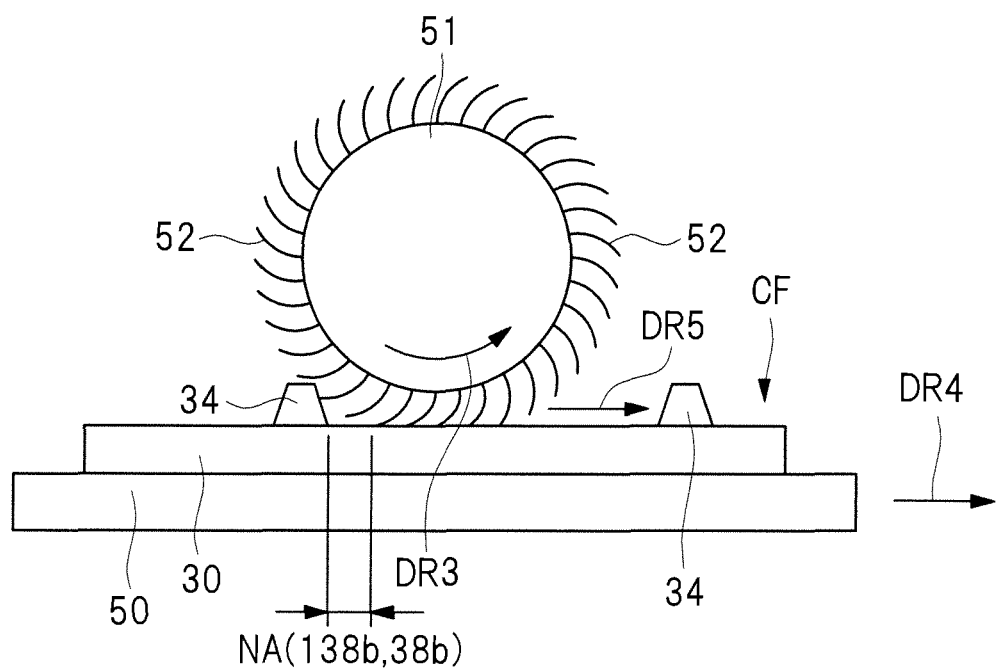
FIG. 14 is a cross-sectional view of a color filter substrate in a rubbing process of the liquid crystal display apparatus of the comparative example 1.

FIG. 14 is a cross-sectional view of a color filter substrate in a rubbing process of the liquid crystal display apparatus of the comparative example 1. Note that, in FIG. 14, illustrations of the light shielding portion 131 (see FIG. 13), the color filter layer 32 (see FIG. 3) and the overcoat layer 33 (see FIG. 3) of the color filter substrate CF are omitted and only the second transparent substrate 30 and the photo spacer (spacer portion) 34 are illustrated for the sake of easy understanding.

As shown in FIG. 14, in the rubbing process, the color filter substrate CF is placed on a rubbing stage 50. On an outermost surface of the color filter substrate CF, an alignment film (not shown) is formed. On an outer peripheral surface of a rubbing roller 51, bristles 52 for rubbing are provided. In FIG. 14, in a state of the rubbing roller 51 rotating at 1500 rpm in the anticlockwise rotating direction shown by the arrow DR3, the rubbing stage 50 on which the color filter substrate CF is placed is moved in the direction of the arrow DR4 at, for example, 30 mm/sec. By this operation, the alignment film formed on the outermost surface of the color filter substrate CF is rubbed in the direction of the arrow DR5 by the rubbing roller 51.

On the other hand, on the color filter substrate CF, the photo spacer (spacer portion) 34 is formed. This photo spacer (spacer portion) 34 forms an unevenness on the outermost surface of the color filter substrate CF. Due to the influence of the unevenness, in a region NA on a downstream side in the rubbing direction DR5 with respect to the photo spacer (spacer portion) 34 on the outermost surface of the color filter substrate CF, the bristles 52 of the rubbing roller 51 are less likely to make contact with the alignment film, and the region is not rubbed by the roller, that is, the rubbing shadow is formed in the alignment film.

On the other hand, the positive direction in the Y axis direction (+Y direction) shown in FIG. 13 corresponds to the rubbing direction DR5 shown in FIG. 14. Therefore, the region NA shown in FIG. 14 includes the region 138b which is in the region 138a shown in FIG. 13, is on the positive direction side in the Y axis direction (+Y direction side) in comparison with the photo spacer (spacer portion) 34, and is on the positive direction side in the Y axis direction (+Y direction side) in comparison with the light shielding portion 136 for gate wiring. More specifically, in FIG. 13, the region 138b is the region in which the rubbing shadow is formed. As a result, in the region 138b, the alignment film (not shown) formed in the color filter substrate CF cannot be sufficiently aligned, and therefore, the orientation of the liquid crystal layer LC cannot be aligned. However, at least a part of the region 138b is not shielded from light by the light shielding portion 131 as described above. Therefore, in the region 138b, the light leakage occurs from a part of pixels when displaying black.

Figure 15:
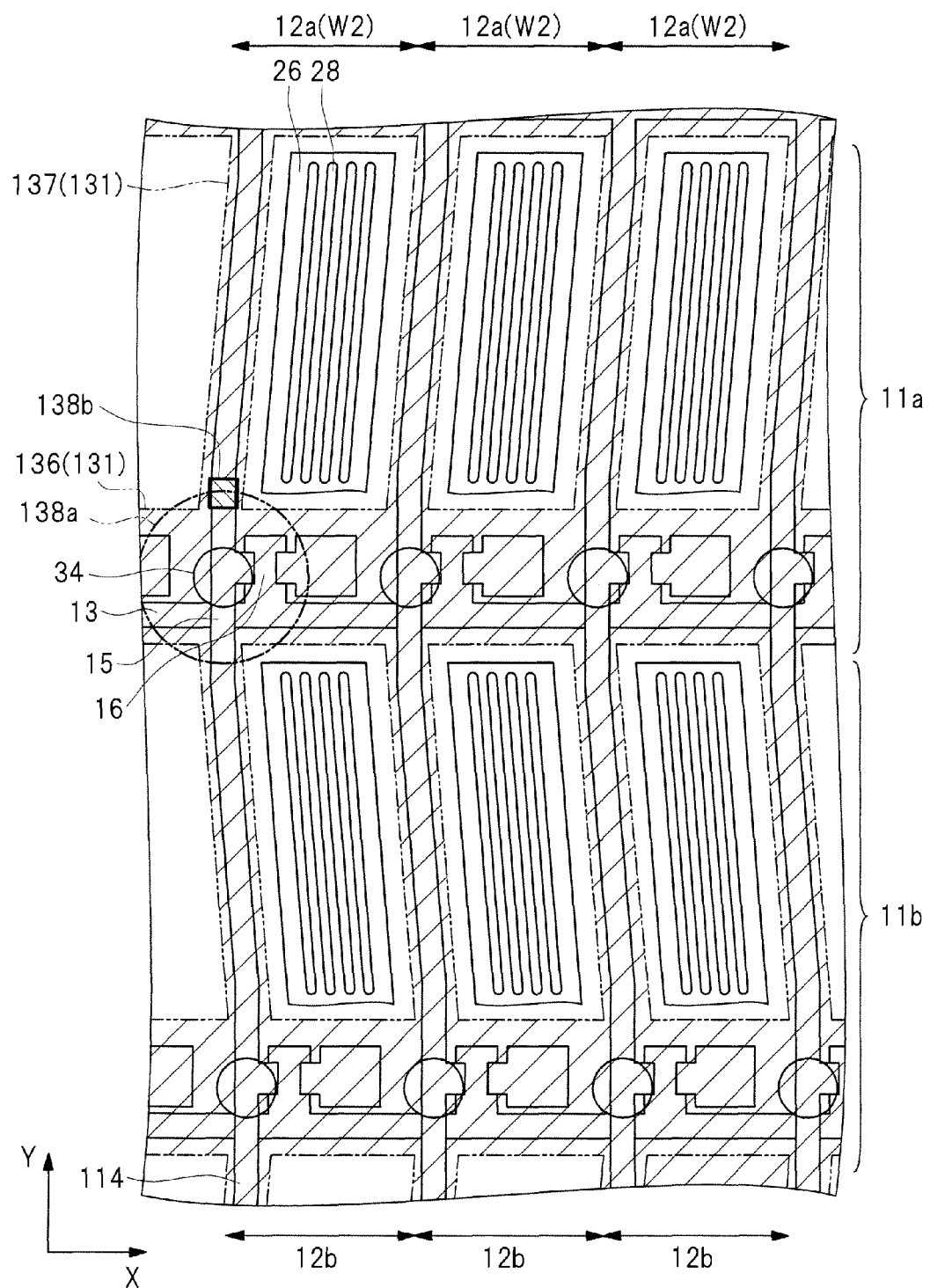
FIG. 15 is a plan view showing an outline of a liquid crystal display apparatus of a comparative example 2.

To move the photo spacer (spacer portion) 34 in the negative direction in the X axis direction (−X direction) to dispose it just above the signal line (source wiring) 114 may be one way to prevent the occurrence of the light leakage like this. More specifically, as a case in which the position of the photo spacer (spacer portion) 34 with respect to the intersecting portion 15 is moved in the negative direction in the X axis direction in comparison with the position in the liquid crystal display apparatus 110 of the comparative example 1, a liquid crystal display apparatus 110a of the comparative example 2 may be possible. FIG. 15 is a plan view showing an outline of the liquid crystal display apparatus of the comparative example 2.

However, in the liquid crystal display apparatus in which the length of one subpixel in the X axis direction is shortened, that is, in which the pixels are miniaturized, the TFTs including the drain electrodes and the signal lines (source wirings) are arranged with almost no space in the X axis direction. Also, in the region overlapped with the drain electrode DE (see FIG. 6) when seen in a plan view, the unevenness is made larger due to the contact hole (see FIG. 7) formed therein, and therefore, the photo spacer (spacer portion) 34 cannot be disposed on the drain electrode DE (see FIG. 6). For this reason, in conjunction with the movement of the photo spacer (spacer portion) 34 in the negative direction in the X axis direction (−X direction), the drain electrode DE (see FIG. 6) of the subpixel 12a adjacent in the negative direction in the X axis direction (−X direction) also has to be moved in the negative direction in the X axis direction (−X direction). As a result, the width W2 (see FIG. 15) of the subpixel 12a of the liquid crystal display apparatus 110a of the comparative example 2 is increased in comparison with the width W1 (see FIG. 4) of the subpixel 12a of the liquid crystal display apparatus 10 of the first embodiment, and it becomes impossible to satisfy the restriction conditions of pixel layout.

<Main Feature and Effect of Present Embodiment>

The liquid crystal display apparatus of the first embodiment is provided with the light shielding portion 38 for spacer portion which shields the photo spacer (spacer portion) 34 from light, and the photo spacer (spacer portion) 34 is disposed in the region 38a in which the light shielding portion 38 for spacer portion is provided when seen in a plan view. Also, the signal line (source wiring) 14 has the bend portion 39 and the bend portion 40 that are bent in mutually different directions at the positions apart from each other in the region 38a in which the light shielding portion 38 for spacer portion is provided when seen in a plan view. The bend portion 39 is bent in the direction DR1 which is tilted with respect to the positive direction in the Y axis direction from the positive direction in the Y axis direction in the region 38a in which the light shielding portion 38 for spacer portion is provided when seen in a plan view. Also, the bend portion 40 is bent in the direction DR2 which is different from the direction DR1 and is tilted with respect to the positive direction in the Y axis direction from the positive direction in the Y axis direction in the region 38a in which the light shielding portion 38 for spacer portion is provided when seen in a plan view.

Also in the liquid crystal display apparatus 10 of the first embodiment, the photo spacer (spacer portion) 34 is provided on the TFT 16 provided at the intersecting portion 15 when seen in a plan view. Also, since the signal line (source wiring) 14 is connected to the source electrode SE extended on the negative direction side in the X axis direction (−X direction side) from the TFT 16, the signal line (source wiring) 14 is provided on the negative direction side in the X axis direction (−X direction side) in comparison with the TFT 16. Therefore, the signal line (source wiring) 14 is provided on the negative direction side in the X axis direction (−X direction side) in comparison with the photo spacer (spacer portion) 34. Also, at the position opposed to the signal line (source wiring) 14, the light shielding portion 37 for source wiring is provided.

In such a case, in the liquid crystal display apparatus 10 of the first embodiment, as shown in FIG. 4, the light shielding portion 31 is provided with the light shielding portion 38 for spacer portion which shields the photo spacer (spacer portion) 34 from light, and the photo spacer (spacer portion) 34 is disposed in the region 38a in which the light shielding portion 38 for spacer portion is provided when seen in a plan view. Also, a part of the light shielding portion 38 for spacer portion is provided outside the region in which the light shielding portion 36 for gate wiring is provided when seen in a plan view. More specifically, in the region 38b which is on the positive direction side in the Y axis direction (+Y direction side) in comparison with the photo spacer (spacer portion) 34 and on the positive direction side in the Y axis direction (+Y direction side) in comparison with the light shielding portion 36 for gate wiring, the light shielding portion 38 for spacer portion is provided. In other words, a portion of the region 38b in the region 38a is shielded from light by the light shielding portion 38 for spacer portion.

Further, in the liquid crystal display apparatus 10 of the first embodiment, the signal line (source wiring) 14 has the bend portion 39 and the bend portion 40. Therefore, as shown in FIG. 4, the signal line (source wiring) 14 can be provided in a portion of the region 38b outside the region 38a. Also, the light shielding portion 37 for source wiring is provided at the position opposed to the signal line (source wiring) 14. Therefore, the portion of the region 38b outside the region 38a is shielded from light by the light shielding portion 37 for source wiring.

In the rubbing process, the alignment film (not shown) cannot be sufficiently aligned in the region 38b (region NA in FIG. 14), and therefore, the orientation of the liquid crystal layer cannot be aligned. However, in the first embodiment, in the region 38b, the alignment film (not shown) formed in the color filter substrate CF is shielded from light by the light shielding portion 38 for spacer portion and the light shielding portion 37 for source wiring. Therefore, in the region 38b, the occurrence of the light leakage from a part of pixels when displaying black can be prevented or suppressed. More specifically, while satisfying the restriction conditions of the pixel layout, the light leakage caused by the occurrence of the so-called rubbing shadow can be reduced, and the performance of the liquid crystal display apparatus can be improved.

Also, in the first embodiment, the bend portion 39 is bent twice alternately in reverse directions when seen in a plan view, and the bend portion 40 is bent twice alternately in reverse directions when seen in a plan view. By bending twice alternately in reverse directions in each of the bend portion 39 and the bend portion 40, the extending direction of the signal line (source wiring) 14 can be made approximately parallel with the Y axis direction, and the position of the intersecting portion 15 can be moved in the X axis direction. Consequently, while satisfying the restriction conditions of the pixel layout, the light leakage caused by the occurrence of the so-called rubbing shadow can be further reduced, and the performance of the liquid crystal display apparatus can be further improved.

Second Embodiment

In the first embodiment, the two bend portions are provided in the region in which the light shielding portion for spacer portion is provided when seen in a plan view. On the other hand, in the second embodiment, the two bend portions are provided outside the region in which the light shielding portion for spacer portion is provided when seen in a plan view.

Figure 16:
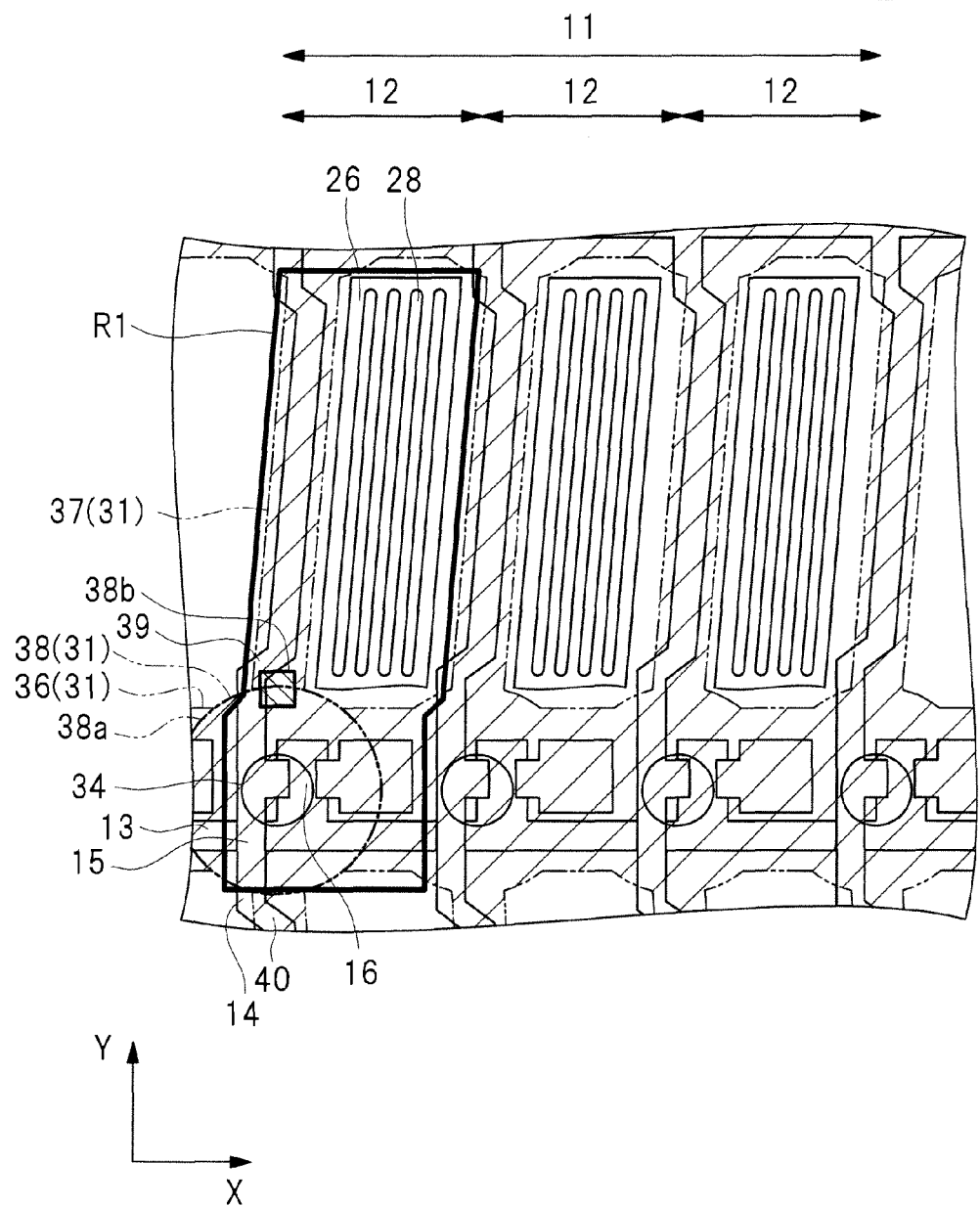
FIG. 16 is a plan view showing an outline of a liquid crystal display apparatus of the second embodiment.

FIG. 16 is a plan view showing an outline of a liquid crystal display apparatus of the second embodiment.

As shown in FIG. 16, a liquid crystal display apparatus 10a of the second embodiment is a liquid crystal display apparatus of an FFS mode utilizing a lateral electric field scheme for color display like the liquid crystal display apparatus 10 of the first embodiment. The pixel 11, the subpixel 12, the scanning line (gate wiring) 13, the intersecting portion 15, the TFT 16 and the photo spacer (spacer portion) 34 of the liquid crystal display apparatus 10a of the second embodiment correspond to the pixel 11, the subpixel 12, the scanning line (gate wiring) 13, the intersecting portion 15, the TFT 16 and the photo spacer (spacer portion) 34 of the liquid crystal display apparatus 10 of the first embodiment. Also, though not shown in FIG. 16, the liquid crystal display apparatus 10a of the second embodiment has the liquid crystal layer LC, the array substrate AR and the color filter substrate CF like the liquid crystal display apparatus 10 of the first embodiment.

Also in the liquid crystal display apparatus 10a of the second embodiment, like the liquid crystal display apparatus 10 of the first embodiment, the light shielding portion 31 has the light shielding portion 38 for spacer portion which shields the photo spacer (spacer portion) 34 from light when seen in a plan view, and the photo spacer (spacer portion) 34 is disposed in the region 38a in which the light shielding portion 38 for spacer portion is provided when seen in a plan view. Also, the signal line (source wiring) 14 has the bend portion 39 and the bend portion 40. The bend portion 39 and the bend portion 40 are provided separately from the bend for reducing the hue difference (retardation) caused depending on the direction of seeing the liquid crystal molecules.

However, as shown in FIG. 16, in the second embodiment, the bend portion 39 and the bend portion 40 are bent in mutually different directions at the positions apart from each other outside the region 38a in which the light shielding portion 38 for spacer portion is provided when seen in a plan view. Specifically, as shown in FIG. 16, the bend portion 39 is provided on the positive direction side in the Y axis direction (+Y direction side) in comparison with the region 38a, and the bend portion 40 is provided on the negative direction side in the Y axis direction (−Y direction side) in comparison with the region 38a. Also, the bend portion 39 is bent in the direction DR1 tilted with respect to the positive direction in the Y axis direction from the positive direction in the Y axis direction when seen in a plan view. Furthermore, the bend portion 40 is bent in the direction DR2 which is different from the direction DR1 and is tilted with respect to the positive direction in the Y axis direction from the positive direction in the Y axis direction when seen in a plan view.

Even when the bend portion 39 and the bend portion 40 are outside the region 38a, if they are provided in the region near the region 38a, the alignment film formed in the color filter substrate CF is shielded from light in the region 38b by the light shielding portion 38 for spacer portion and the light shielding portion 37 for source wiring like the first embodiment. Therefore, in the region 38b, the occurrence of the light leakage from a part of pixels when displaying black can be prevented or suppressed. More specifically, while satisfying the restriction conditions of the pixel layout, the light leakage caused by the occurrence of the so-called rubbing shadow can be reduced, and the performance of the liquid crystal display apparatus can be improved.

Note that, also in the second embodiment, by bending twice alternately in reverse directions in each of the bend portion 39 and the bend portion 40, the extending direction of the signal line (source wiring) 14 can be made approximately parallel with the Y axis direction, and the position of the intersecting portion 15 can be moved in the X axis direction like the first embodiment.

Third Embodiment

In the first embodiment, in the two subpixels adjacent in the Y axis direction, the extending direction of the signal line (source wiring) is tilted with respect to the rubbing direction (positive direction in the Y axis direction) by $+\alpha$ and $-\alpha$, respectively. On the other hand, in the third embodiment, two regions are provided in one subpixel, and in the two regions, the extending direction of the signal line (source wiring) is tilted with respect to the rubbing direction (positive direction in the Y axis direction) by $+\alpha$ and $-\alpha$, respectively.

Figure 17:
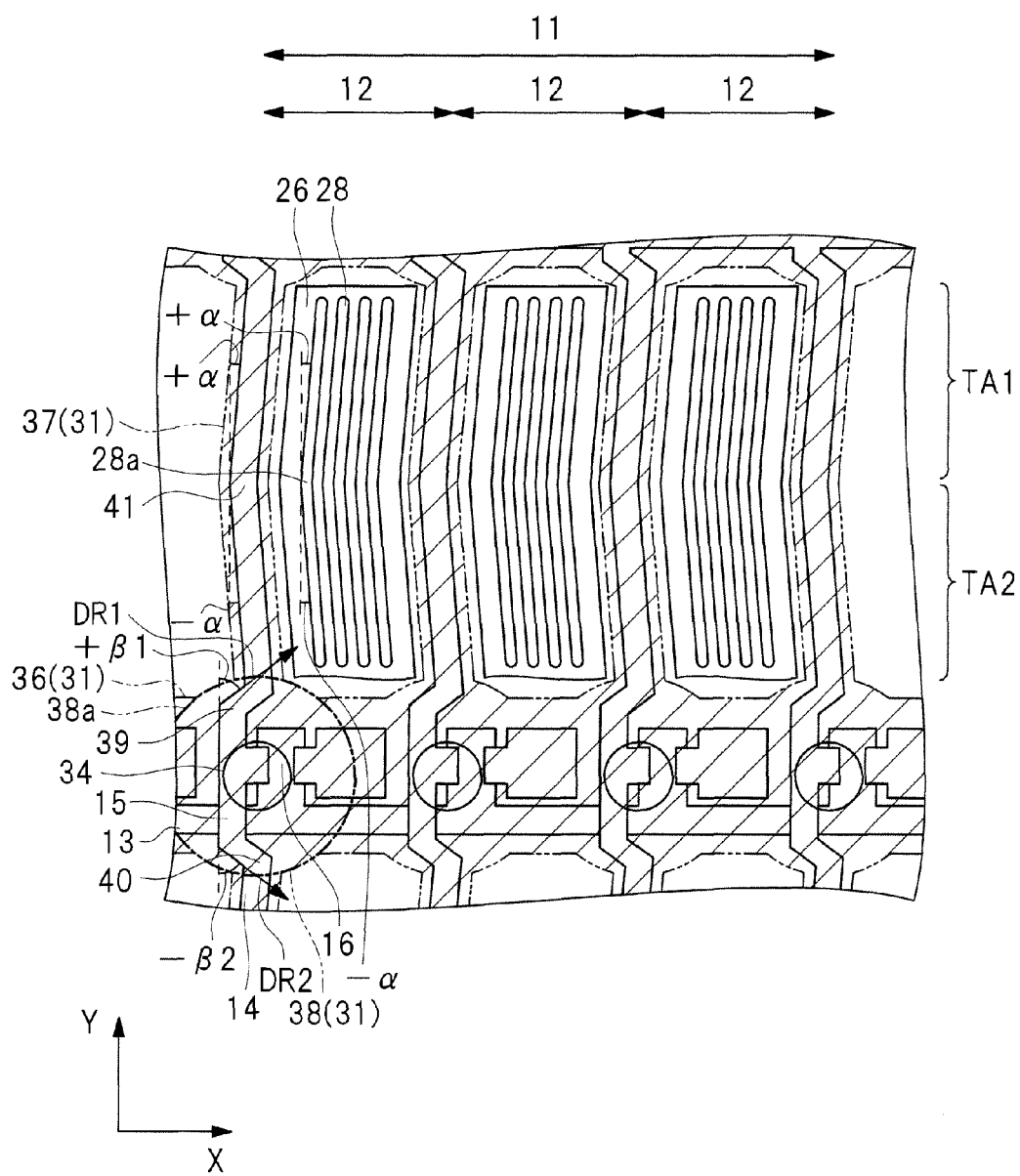
FIG. 17 is a plan view showing an outline of a liquid crystal display apparatus of the third embodiment.

FIG. 17 is a plan view showing an outline of a liquid crystal display apparatus of the third embodiment.

As shown in FIG. 17, a liquid crystal display apparatus 10b of the third embodiment is a liquid crystal display apparatus of an FFS mode utilizing a lateral electric field scheme for color display like the liquid crystal display apparatus 10 of the first embodiment. The pixel 11, the subpixel 12, the scanning line (gate wiring) 13, the intersecting portion 15, the TFT 16 and the photo spacer (spacer portion) 34 of the liquid crystal display apparatus 10b of the third embodiment correspond to the pixel 11, the subpixel 12, the scanning line (gate wiring) 13, the intersecting portion 15, the TFT 16 and the photo spacer (spacer portion) 34 of the liquid crystal display apparatus 10 of the first embodiment. Also, though not shown in FIG. 17, the liquid crystal display apparatus 10b of the third embodiment has the liquid crystal layer LC, the array substrate AR and the color filter substrate CF like the liquid crystal display apparatus 10 of the first embodiment.

Also in the liquid crystal display apparatus 10b of the third embodiment, the slit-like aperture 28 is formed in the upper electrode 26 in the subpixel 12 like the liquid crystal display apparatus 10 of the first embodiment. Also, the extending direction of the slit-like apertures 28 is made closer to the Y axis direction rather than the X axis direction, thereby reducing the number of end portions of the slit-like apertures 28 to suppress the decrease of the aperture ratio.

On the other hand, in the liquid crystal display apparatus 10b of the third embodiment, unlike the liquid crystal display apparatus 10 of the first embodiment, the slit-like aperture 28 has a bend portion 28a therein, that is, at the center in the extending direction of the slit-like aperture 28. As a result, in the portion on the positive direction side in the Y axis direction (+Y direction side) from the bend portion 28a, the extending direction of the slit-like aperture 28 is tilted with respect to the rubbing direction (positive direction in the Y axis direction) by $+\alpha$ (clockwise direction is defined as positive and cc is defined as positive). Also, in the portion on the negative direction side in the Y axis direction (−Y direction side) from the bend portion 28a, the extending direction of the slit-like aperture 28 is tilted with respect to the rubbing direction (positive direction in the Y axis direction) by $-\alpha$. More specifically, in order to reduce the hue difference (retardation) caused depending on the direction of seeing the liquid crystal molecules, the liquid crystal display apparatus 10b of the third embodiment has the region TA1 in which the extending direction of the slit-like aperture 28 is tilted by $+\alpha$ with respect to the rubbing direction (positive direction in the Y axis direction) and the region TA2 in which it is tilted by $-\alpha$. The tilt angle $\alpha$ can be set to, for example, 5 degrees.

Also, in conjunction with the extending direction of the slit-like aperture 28 being tilted with respect to the rubbing direction (positive direction in the Y axis direction) by $+\alpha$ and $-\alpha$ in the region TA1 and the region TA2, the signal line (source wiring) 14 also has a bend portion 41 therein, for example, at the center in the extending direction of the signal line (source wiring) 14 in the third embodiment. More specifically, in the third embodiment, the signal line (source wiring) 14 extends in the direction tilted with respect to the rubbing direction (positive direction in the Y axis direction) by the angle of $+\alpha$ in the portion on the positive direction side in the Y axis direction (+Y direction side) from the bend portion 41 in one subpixel 12. Also, the signal line (source wiring) 14 extends in the direction tilted with respect to the rubbing direction (positive direction in the Y axis direction) by the angle of $-\alpha$ in the portion on the negative direction side in the Y axis direction (−Y direction side) from the bend portion 41 in one subpixel 12. As a result, the signal line (source wiring) 14 is bent with respect to the Y axis direction by the angle of $2\alpha$ at front and back of the bend portion 41 in one subpixel 12.

By forming the signal line (source wiring) 14 to have the shape corresponding to the bend of the slit-like aperture 28, the upper electrode 26 can also be formed to have the external shape corresponding to the bend of the slit-like aperture 28 and the signal line (source wiring) 14. Therefore, the direction and intensity of the electric field generated between the upper electrode 26 and the lower electrode 24 can be made uniform in one subpixel.

In the liquid crystal display apparatus 10b of the third embodiment, the light shielding portion 31 has the light shielding portion 38 for spacer portion which shields the photo spacer (spacer portion) 34 from light, and the photo spacer (spacer portion) 34 is disposed in the region 38a in which the light shielding portion 38 for spacer portion is provided when seen in a plan view. Also, the signal line (source wiring) 14 has the bend portion 39 and the bend portion 40 which are bent in mutually different directions at the positions apart from each other in the region 38a in which the light shielding portion 38 for spacer portion is provided when seen in a plan view. Also, the bend portion 41 of the signal line (source wiring) 14 described above is provided in the region outside the region 38a. The bend portion 39 is bent in the direction DR1 tilted with respect to the positive direction in the Y axis direction from the positive direction in the Y axis direction in the region 38a in which the light shielding portion 38 for spacer portion is provided when seen in a plan view. Also, the bend portion 40 is bent in the direction DR2 which is different from the direction DR1 and is tilted with respect to the positive direction in the Y axis direction from the positive direction in the Y axis direction in the region 38a in which the light shielding portion 38 for spacer portion is provided when seen in a plan view.

Also in the third embodiment, like the first embodiment, the bend portion 39 and the bend portion 40 are provided separately from the bend for reducing the hue difference (retardation). In this manner, while satisfying the restriction conditions of the pixel layout, the light leakage caused by the occurrence of the so-called rubbing shadow can be reduced and the performance of the liquid crystal display apparatus can be improved.

Also in the third embodiment, like the first embodiment, the bend portion 39 is bent twice alternately in reverse directions when seen in a plan view, and the bend portion 40 is bent twice alternately in reverse directions when seen in a plan view. By bending twice alternately in reverse directions in this manner, for example, the extending direction of the signal line (source wiring) 14 can be made approximately parallel with the Y axis direction, and the position of the intersecting portion 15 can be moved in the X axis direction.

Fourth Embodiment

In the first embodiment, in the two subpixels adjacent in the Y axis direction, the extending direction of the signal line (source wiring) is tilted with respect to the rubbing direction (positive direction in the Y axis direction) by +α and −α, respectively. On the other hand, in the fourth embodiment, the extending direction of the signal line (source wiring) is not tilted with respect to the rubbing direction (positive direction in the Y axis direction) and is parallel with the rubbing direction (positive direction in the Y axis direction).

Figure 18:
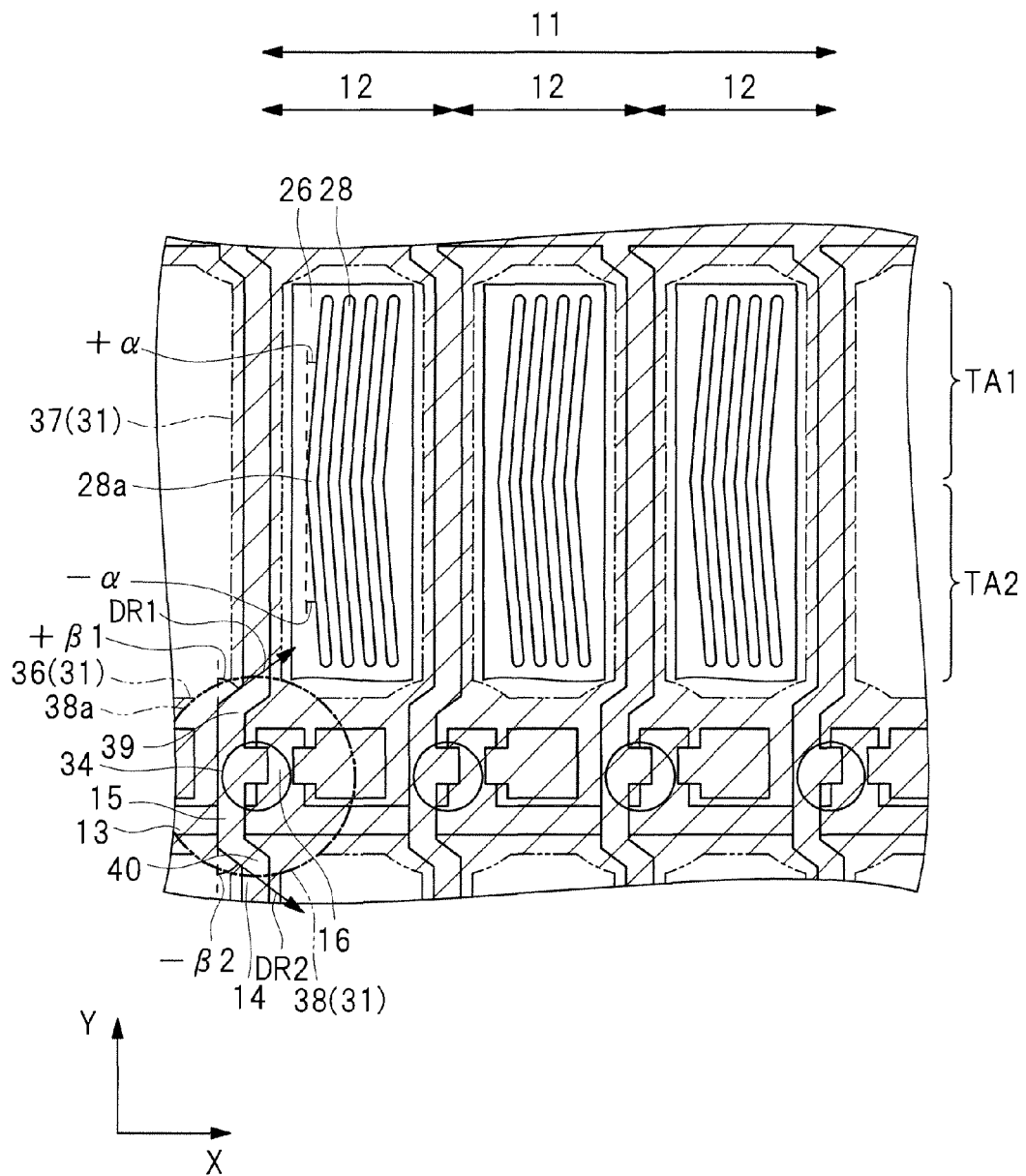
FIG. 18 is a plan view showing an outline of a liquid crystal display apparatus of the fourth embodiment.

FIG. 18 is a plan view showing an outline of a liquid crystal display apparatus of the fourth embodiment.

As shown in FIG. 18, a liquid crystal display apparatus 10c of the fourth embodiment is a liquid crystal display apparatus of an FFS mode utilizing a lateral electric field scheme for color display like the liquid crystal display apparatus 10 of the first embodiment. The pixel 11, the subpixel 12, the scanning line (gate wiring) 13, the intersecting portion 15, the TFT 16 and the photo spacer (spacer portion) 34 of the liquid crystal display apparatus 10c of the fourth embodiment correspond to the pixel 11, the subpixel 12, the scanning line (gate wiring) 13, the intersecting portion 15, the TFT 16 and the photo spacer (spacer portion) 34 of the liquid crystal display apparatus 10 of the first embodiment. Also, though not shown in FIG. 18, the liquid crystal display apparatus 10c of the fourth embodiment has the liquid crystal layer LC, the array substrate AR and the color filter substrate CF like the liquid crystal display apparatus 10 of the first embodiment.

Also in the liquid crystal display apparatus 10c of the fourth embodiment, the slit-like aperture 28 is formed in the upper electrode 26 in the subpixel 12 like the liquid crystal display apparatus 10 of the first embodiment. Also, the extending direction of the slit-like apertures 28 is made closer to the Y axis direction rather than the X axis direction, thereby reducing the number of end portions of the slit-like apertures 28 to suppress the decrease of the aperture ratio.

Furthermore, also in the liquid crystal display apparatus 10c of the fourth embodiment, like the liquid crystal display apparatus 10b of the third embodiment, the slit-like aperture 28 has the bend portion 28a therein, for example, at the center in the extending direction of the slit-like aperture 28. More specifically, in order to reduce the hue difference (retardation) caused depending on the direction of seeing the liquid crystal molecules, the liquid crystal display apparatus 10c of the fourth embodiment has the region TA1 in which the extending direction of the slit-like aperture 28 is tilted by +α with respect to the rubbing direction (positive direction in the Y axis direction) and the region TA2 in which it is tilted by −α.

On the other hand, in the fourth embodiment, the extending direction of the signal line (source wiring) 14 is not tilted with respect to the rubbing direction (positive direction in the Y axis direction) and is parallel with the Y axis direction. More specifically, in the fourth embodiment, the signal line (source wiring) 14 is not bent and is formed linearly.

Even in such a configuration, for example, when the tilt angle α of the slit-like aperture 28 with respect to the rubbing direction (positive direction in the Y axis direction) is small, the direction and intensity of the electric field generated between the upper electrode 26 and the lower electrode 24 can be made uniform in one subpixel.

In the liquid crystal display apparatus 10c of the fourth embodiment, the light shielding portion 31 has the light shielding portion 38 for spacer portion which shields the photo spacer (spacer portion) 34 from light, and the photo spacer (spacer portion) 34 is disposed in the region 38a in which the light shielding portion 38 for spacer portion is provided when seen in a plan view. Also, the signal line (source wiring) 14 has the bend portion 39 and the bend portion 40 which are bent in mutually different directions at the positions apart from each other in the region 38a in which the light shielding portion 38 for spacer portion is provided when seen in a plan view. The bend portion 39 is bent in the direction DR1 tilted with respect to the positive direction in the Y axis direction from the positive direction in the Y axis direction in the region 38a in which the light shielding portion 38 for spacer portion is provided when seen in a plan view. Also, the bend portion 40 is bent in the direction DR2 which is different from the direction DR1 and is tilted with respect to the positive direction in the Y axis direction from the positive direction in the Y axis direction in the region 38a in which the light shielding portion 38 for spacer portion is provided when seen in a plan view. Furthermore, in the region outside the region 38a, the signal line (source wiring) 14 extends in parallel with the Y axis direction.

Also in the fourth embodiment, like the first embodiment, the bend portion 39 and the bend portion 40 are provided separately from the bend for reducing the hue difference (retardation). In this manner, while satisfying the restriction conditions of the pixel layout, the light leakage caused by the occurrence of the so-called rubbing shadow can be reduced and the performance of the liquid crystal display apparatus can be improved.

Also in the fourth embodiment, like the first embodiment, the bend portion 39 is bent twice alternately in reverse directions when seen in a plan view, and the bend portion 40 is bent twice alternately in reverse directions when seen in a plan view. By bending twice alternately in reverse directions in this manner, for example, the extending direction of the signal line (source wiring) 14 can be made approximately parallel with the Y axis direction, and the position of the intersecting portion 15 can be moved in the X axis direction.

Fifth Embodiment

Next, an electronic device of the fifth embodiment will be described. In the first to fourth embodiments, the liquid crystal display apparatuses provided with the light shielding portion for spacer portion and two bend portions have been described. On the other hand, in the fifth embodiment, an electronic device having any one of the liquid crystal display apparatuses described in the first to fourth embodiments as a display unit will be described with using a mobile phone as an example.

Figure 19:
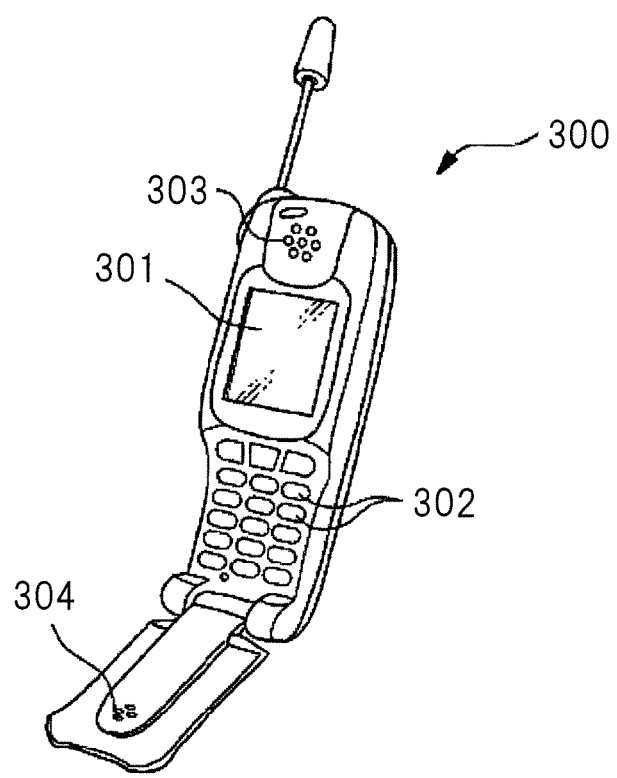
FIG. 19 is a perspective view showing a mobile phone as an example of an electronic device of the fifth embodiment.

FIG. 19 is a perspective view showing a mobile phone as an example of an electronic device of the fifth embodiment.

As shown in FIG. 19, a mobile phone 300 includes any one of the liquid crystal display apparatuses of the first to fourth embodiments as a display unit 301, and is made up of a plurality of operation buttons 302, an earpiece 303 and a mouthpiece 304.

As the display unit 301, for example, any one of the liquid crystal display apparatuses 10 to 10c of the first to fourth embodiments can be used. Consequently, the light leakage when displaying black can be prevented in the display unit 301 even if the pixels are miniaturized, and the contrast can be improved. Therefore, the performance of the mobile phone as an electronic device can be improved.

Note that the electronic device having any one of the liquid crystal display apparatuses 10 to 10c of the first to fourth embodiments as a display unit is not limited to the mobile phone described above. The liquid crystal display apparatuses 10 to 10c of the first to fourth embodiments can be preferably used as a display unit of various electronic devices such as an electronic book, a personal computer, a digital still camera, a liquid crystal television, a view finder type or monitor direct view type video tape recorder, a car navigation system, a device provided with pager and others. In addition, the liquid crystal display apparatuses 10 to 10c of the first to fourth embodiments can be preferably used as a display unit of various electronic devices such as an electronic organizer, an electronic calculator, a word processor, a work station, a videophone, a POS (Point of Sale) terminal, a device provided with a touch panel and others. Consequently, in any of the electronic devices, the light leakage when the black is displayed can be prevented in the display unit even if the pixels are miniaturized, and the contrast can be improved. Therefore, the performance of various types of electronic devices described above can be improved.

In the foregoing, the invention made by the inventors of the present invention has been concretely described based on the embodiments. However, it is needless to say that the present invention is not limited to the foregoing embodiments and various modifications and alterations can be made within the scope of the present invention.

The present invention can be effectively applied to a liquid crystal display apparatus and an electronic device.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A liquid crystal display apparatus comprising:
   a first substrate;
   a second substrate disposed so as to be opposed to the first substrate;
   a liquid crystal layer sandwiched between the first substrate and the second substrate;
   a plurality of gate wirings provided on the first substrate along a first direction when seen in a plan view;
   a plurality of source wirings provided on the first substrate along a second direction intersecting with the first direction when seen in a plan view;
   a plurality of pixels delimited by the plurality of gate wirings and the plurality of source wirings;
   a thin-film transistor provided at an intersecting portion of the gate wiring and the source wiring;
   a light shielding portion provided in a portion of the second substrate between the plurality of pixels; and
   a spacer portion provided at the intersecting portion for maintaining a space between the first substrate and the second substrate,
   wherein the light shielding portion includes:
   a light shielding portion for gate wiring disposed at a position opposed to the gate wiring;
   a light shielding portion for source wiring disposed at a position opposed to the source wiring; and
   a light shielding portion for spacer portion, which shields the spacer portion from light,
   the light shielding portion for spacer portion is partly provided in a region outside a region in which the light shielding portion for gate wiring or the light shielding portion for source wiring is provided when seen in a plan view,
   the spacer portion is disposed in a region in which the light shielding portion for spacer portion is provided when seen in a plan view, and
   the source wiring includes:
   a first bend portion which is bent in a third direction in the region in which the light shielding portion for spacer portion is provided when seen in a plan view; and
   a second bend portion which is bent in a fourth direction, which is different from the third direction, in the region in which the light shielding portion for spacer portion is provided when seen in a plan view,
   the first bend portion is bent twice alternately in reverse directions when seen in a plan view, and
   the second bend portion is bent twice alternately in reverse directions when seen in a plan view.

2. The liquid crystal display apparatus according to claim 1,
   wherein the first bend portion is bent in a fifth direction, which is tilted clockwise by a first tilt angle with respect to the second direction, from the second direction at a first position, and is bent in the third direction, which is tilted clockwise by a second tilt angle with respect to the second direction, from the fifth direction at a second position different from the first position, and
   the first tilt angle is larger than the second tilt angle.

3. The liquid crystal display apparatus according to claim 1,
   wherein the plurality of pixels include a first pixel and a second pixel adjacent along the source wiring,
   the thin film transistor, the spacer portion and the light shielding portion for spacer portion are provided in the first pixel,
   in the first pixel, the source wiring extends in the second direction in a region outside the region in which the light shielding portion for spacer portion is provided when seen in a plan view, and
   in the second pixel, the source wiring extends in a sixth direction, which is different from the second direction, when seen in a plan view.

4. The liquid crystal display apparatus according to claim 1, wherein the source wiring has a third bend portion which is bent in a region outside the region in which the light shielding portion for spacer portion is provided when seen in a plan view.

5. The liquid crystal display apparatus according to claim 1,
wherein the source wiring is disposed in a region in which the light shielding portion is provided when seen in a plan view.

6. The liquid crystal display apparatus according to claim 1,
wherein the spacer portion is provided in the second substrate.

7. An electronic device provided with the liquid crystal display apparatus according to claim 1.

* * * * *